United States Patent
Yin et al.

(10) Patent No.: US 12,248,673 B2
(45) Date of Patent: Mar. 11, 2025

(54) SYSTEMS AND METHODS FOR ATTRIBUTING A SCROLL EVENT IN AN INFINITE SCROLL GRAPHICAL USER INTERFACE

(71) Applicant: Google LLC, Mountain View, CA (US)

(72) Inventors: Tianjiu Yin, Mountain View, CA (US); Kun Zhang, Pleasanton, CA (US)

(73) Assignee: GOOGLE LLC, Mountain View, CA (US)

( * ) Notice: Subject to any disclaimer, the term of this patent is extended or adjusted under 35 U.S.C. 154(b) by 152 days.

(21) Appl. No.: 16/793,926

(22) Filed: Feb. 18, 2020

(65) Prior Publication Data
US 2020/0183559 A1     Jun. 11, 2020

Related U.S. Application Data

(63) Continuation of application No. 15/014,795, filed on Feb. 3, 2016, now Pat. No. 10,585,576.

(Continued)

(51) Int. Cl.
*G06F 3/0485*     (2022.01)
*G06F 3/0483*     (2013.01)
(Continued)

(52) U.S. Cl.
CPC .......... *G06F 3/0485* (2013.01); *G06F 3/0483* (2013.01); *G06F 3/04855* (2013.01); *G06F 3/04886* (2013.01); *G06F 9/451* (2018.02)

(58) Field of Classification Search
CPC ............... G06F 3/04855; G06F 17/30873
See application file for complete search history.

(56) References Cited

U.S. PATENT DOCUMENTS

| | | |
|---|---|---|
| 6,912,694 B1 | 6/2005 | Harrison et al. |
| 7,428,709 B2 | 9/2008 | Forstall et al. |

(Continued)

FOREIGN PATENT DOCUMENTS

| | | |
|---|---|---|
| JP | 2009-527052 A | 7/2009 |
| WO | WO-2004/031994 A1 | 4/2004 |

(Continued)

OTHER PUBLICATIONS

Notice of Allowance for U.S. Appl. No. 16/379,344 dated Jul. 8, 2020 (6 pages).

(Continued)

*Primary Examiner* — Cesar B Paula
*Assistant Examiner* — Sajeda Muhebbullah
(74) *Attorney, Agent, or Firm* — DORITY & MANNING P.A.

(57) ABSTRACT

Systems and methods for attributing a scroll event are described herein. The system can provide, to a client device, an infinite scroll attribution script. The script can cause the client device to set a dimension of an inline frame, embedded with a content document, of an page to a dimension corresponding to a viewport of an application and determine, responsive to detecting a scroll event, that a first offset between a first content document end and a first viewport end is less than or equal to a first predetermined threshold. The script can further cause the client device to determine, responsive to detecting the scroll event, that a second offset between a second content document end and a second viewport end is greater than or equal to a second threshold and assign the scroll event to the inline frame responsive to the determinations of the first and second offsets.

20 Claims, 7 Drawing Sheets

Related U.S. Application Data

(60) Provisional application No. 62/246,453, filed on Oct. 26, 2015.

(51) Int. Cl.
  *G06F 3/04855* (2022.01)
  *G06F 3/04886* (2022.01)
  *G06F 9/451* (2018.01)

(56) References Cited

U.S. PATENT DOCUMENTS

| | | | |
|---|---|---|---|
| 7,756,880 B2 | 7/2010 | Sighart et al. | |
| 8,307,278 B1 | 11/2012 | Spear | |
| 8,423,901 B2 | 4/2013 | D'Entremont et al. | |
| 8,555,193 B2* | 10/2013 | Sar | G06F 9/451 715/764 |
| 8,589,367 B2 | 11/2013 | Sighart et al. | |
| 9,575,615 B1 | 2/2017 | Nicholls et al. | |
| 9,852,759 B2 | 12/2017 | Doherty et al. | |
| 9,865,005 B1 | 1/2018 | Pottjegort | |
| 9,971,846 B1* | 5/2018 | Krecichwost | G06F 16/9577 |
| 2005/0160360 A1 | 7/2005 | Nadamoto et al. | |
| 2006/0174214 A1 | 8/2006 | McKee et al. | |
| 2006/0212803 A1* | 9/2006 | Arokiaswamy | G06F 16/972 715/201 |
| 2007/0198476 A1 | 8/2007 | Farago et al. | |
| 2009/0240683 A1 | 9/2009 | Lazier et al. | |
| 2009/0327869 A1 | 12/2009 | Fan et al. | |
| 2009/0327952 A1 | 12/2009 | Karas et al. | |
| 2010/0017289 A1 | 1/2010 | Sah et al. | |
| 2010/0179949 A1 | 7/2010 | Safar | |
| 2010/0235765 A1 | 9/2010 | Worthington | |
| 2011/0082755 A1 | 4/2011 | Itzhak | |
| 2011/0184960 A1 | 7/2011 | Delpha et al. | |
| 2011/0191716 A1 | 8/2011 | Sakamoto et al. | |
| 2012/0054596 A1 | 3/2012 | Kroger et al. | |
| 2012/0246593 A1* | 9/2012 | Rauenzahn | G06F 3/0485 715/784 |
| 2012/0254729 A1 | 10/2012 | Wan | |
| 2013/0027408 A1 | 1/2013 | Garg | |
| 2013/0054371 A1* | 2/2013 | Mason | G06Q 30/0267 705/14.64 |
| 2013/0305170 A1 | 11/2013 | De Souza et al. | |
| 2014/0006982 A1 | 1/2014 | Wabyick et al. | |
| 2014/0071483 A1* | 3/2014 | Urakawa | H04N 1/0035 358/1.15 |
| 2014/0136528 A1 | 5/2014 | Anima et al. | |
| 2014/0149922 A1 | 5/2014 | Hauser et al. | |
| 2014/0195337 A1 | 7/2014 | Taylor et al. | |
| 2014/0195890 A1 | 7/2014 | Taylor et al. | |
| 2014/0281901 A1 | 9/2014 | Mostowy et al. | |
| 2014/0281924 A1 | 9/2014 | Chipman et al. | |
| 2014/0358668 A1 | 12/2014 | Fredinburg et al. | |
| 2014/0372937 A1* | 12/2014 | Shieh | G06F 3/0486 715/784 |
| 2015/0007108 A1 | 1/2015 | Ozcelik | |
| 2015/0154660 A1 | 6/2015 | Weald et al. | |
| 2015/0160817 A1 | 6/2015 | Hwang et al. | |
| 2015/0213487 A1 | 7/2015 | Nwosu | |
| 2016/0004781 A1 | 1/2016 | Sturm et al. | |
| 2016/0019604 A1 | 1/2016 | Kobayashi et al. | |
| 2016/0034976 A1* | 2/2016 | Dayanand | G06Q 30/0277 705/14.73 |
| 2016/0328755 A1* | 11/2016 | Uchida | G09G 5/14 |
| 2017/0024098 A1 | 1/2017 | Doherty et al. | |
| 2018/0130097 A1 | 5/2018 | Tran et al. | |
| 2018/0197575 A1 | 7/2018 | Doherty et al. | |

FOREIGN PATENT DOCUMENTS

| | | |
|---|---|---|
| WO | WO-2011/084860 A2 | 7/2011 |
| WO | WO-2013/033445 A2 | 3/2013 |
| WO | WO 2015/107670 | 7/2015 |

OTHER PUBLICATIONS

Baxter, Richard, "On Indefinite Scroll, pushState and SEO", Apr. 20, 2015, retrieved Jul. 1, 2021 from URL: https://web.archive.org/web/20150420095702/https://builtvisible.com/on-infinite-scroll-pushstate/ (9 pages).

First Office Action for CN Appln. Ser. No. 201680028297.X dated Jun. 3, 2021 (23 pages).

Examination Report for EP Appln. Ser. No. 16760267.1 dated Apr. 30, 2020 (6 pages).

Non-Final Office Action for U.S. Appl. No. 16/379,344 dated May 15, 2020 (7 pages).

Examination Report for IN Appln. Ser. No. 201747044317 dated Nov. 25, 2020 (6 pages).

First Office Action for CN Appln. Ser. No. 201680034837.5 dated Sep. 16, 2020 (12 pages).

Examination Report for EP Appln. Ser. No. 16795189.6 dated Apr. 30, 2021 (6 pages).

Examination Report for GB Appln. Ser. No. 1720780.4 dated Apr. 29, 2021 (2 pages).

"Iframe . . .", HTML Code Tutorial, Dec. 5, 2015, retrieved Dec. 8, 2015 from URL: http://www.htmlcodetutorial.com/frames/_IFRAME.html (2 pages).

"infinity.js", Airbnb, Inc., 2012, retrieved Oct. 19, 2016 from URL: http://airbnb.io/infinity/docs/infinity.html (8 pages).

Baxter, Richard, "Infinite Scroll, pushState and SEO", Oct. 7, 2014, XP055312334, retrieved Feb. 8, 2018 from URL: https://builtvisible.com/on-infinite-scroll-pushstate/ (8 pages).

Baxter, Richard, "Infinite Scroll, pushState and SEO", Oct. 7, 2014, XP055312334, retrieved Oct. 19, 2016 from URL: https://builtvisible.com/on-infinite-scroll-pushstate/ (8 pages).

Final Office Action for U.S. Appl. No. 15/014,795 dated Jan. 2, 2019 (12 pages).

International Preliminary Report on Patentability for PCT Appln. Ser. No. PCT/US2016/047887 dated Jan. 12, 2018 (28 pages).

International Preliminary Report on Patentability for PCT Appln. Ser. No. PCT/US2016/058833 dated Mar. 1, 2018 (26 pages).

International Search Report and Written Opinion for PCT Appln. Ser. No. PCT/US2016/047887 dated Nov. 8, 2016 (12 pages).

International Search Report and Written Opinion for PCT Appln. Ser. No. PCT/US2016/058833 dated Feb. 16, 2017 (14 pages).

Naver, "A Reply to iframe from Naver," dated May 30, 2009, retrieved from URL: https://kin.naver.com/qna/detail.nhn?d1id=1&dirId=105&docId=69486524&qb=7J2465287J24IO2UhOugiOyehCDsiqTtgazroaQ=&enc=utf8?ion=kin&rank=3&search_sort=0&spq=0&pid=U5eYG1pySDVsstYnu2VssssssZ281040&SID=DtFAQnAeOLxTcq50Rhe0Mg%3D%3D (3 pages).

Non-Final Office Action for U.S. Appl. No. 15/014,795 dated Jun. 15, 2018 (11 pages).

Non-Final Office Action for U.S. Appl. No. 15/018,667 dated Apr. 30, 2018 (14 pages).

Notice of Allowance for JP Appln. Ser. No. 2017-567733 dated Aug. 14, 2019 (6 pages).

Notice of Allowance for U.S. Appl. No. 15/014,795 dated Jan. 15, 2020 (5 pages).

Notice of Allowance for U.S. Appl. No. 15/014,795 dated Sep. 9, 2019 (5 pages).

Notice of Allowance for U.S. Appl. No. 15/018,667 dated Apr. 2, 2019 (2 pages).

Notice of Allowance for U.S. Appl. No. 15/018,667 dated Jan. 3, 2019 (9 pages).

Office Action for KR Appln. Ser. No. 10-20177035508 dated Mar. 29, 2019 (15 pages).

Office Action on EP Appln. Ser. No. 16795189.6 dated Nov. 12, 2019 (8 pages).

Reasons for Rejections for JP Appln. Ser. No. 2017-567733 dated Feb. 25, 2019 (6 pages).

Svensson, Christer, "HTML5 and Seamless Iframes with JavaScript", christersvensson.com, Jan. 1, 2012, XP055341156, retrieved Feb. 6, 2018 from URL: http://www.christersvensson.com/html-tool/iframe.htm (3 pages).

(56) References Cited

OTHER PUBLICATIONS

Zimmerman, Christopher, "Strategies for the iFrame on the iPad Problem", Magnolia Blogs, May 18, 2012, XP055342211, retrieved Feb. 6, 2018 from URL: https://blogs.magnolia-cms.com/christopher-zimmerman/detail~@strategies-for-the-iframe . . . (8 pages).
United Kingdom Search Report Corresponding to Application No. 2117238.2 on Jan. 24, 2022.

\* cited by examiner

SYSTEMS AND METHODS FOR ATTRIBUTING A SCROLL EVENT IN AN INFINITE SCROLL GRAPHICAL USER INTERFACE

CROSS-REFERENCES TO RELATED APPLICATIONS

This application claims the benefit of priority under 35 U.S.C. § 120 as a continuation application of U.S. patent application Ser. No. 15/014,795, filed Feb. 3, 2016, which claims the benefit of priority under 35 U.S.C. § 119 to U.S. Provisional Application No. 62/246,453, filed on Oct. 26, 2015, each of which is hereby incorporated by reference herein in its entirety.

BACKGROUND

In a computer networked environment such as the internet, third-party content providers provide third-party content items for display on end-user computing devices. These third-party content items, for example, advertisements, can be linked to web pages associated with the third-party content providers. These third-party content items can include content identifying the third-party content provider that provided the content item.

SUMMARY

At least one aspect is directed to a method of attributing a scroll event on an application. The method can include providing, to a client device, an infinite scroll attribution script. The script can be configured to execute on the client device to cause the client device to set a dimension of a first inline frame of an information resource page to correspond to a dimension of a viewport of an application on which the information resource is displayed. The first inline frame can be embedded with at least a first content document. The script can be configured to execute on the client device to cause the client device to monitor for a scroll event on the application. The script can be configured to execute on the client device to cause the client device to determine, responsive to detecting the scroll event, for the first inline frame, that a first offset between a first content document end of the first content document and a first viewport end of the viewport is less than or equal to a first predetermined threshold value. The script can be configured to execute on the client device to cause the client device to determine, responsive to detecting the scroll event, for the first inline frame, that a second offset between a second content document end of the first content document and a second viewport end of the viewport is greater than or equal to a second predetermined threshold value. The script can be configured to execute on the client device to cause the client device to assign, responsive to determining that the first offset is less than or equal to the first predetermined threshold value and determining that the second offset is greater than or equal to the second predetermined threshold value, the scroll event to the first inline frame. The script can be configured to execute on the client device to cause the client device to assign, responsive to determining that at least one of the first offset is not less than or equal to the first predetermined threshold value and determining that the second offset is not greater than or equal to the second predetermined threshold value, the scroll event to the information resource page.

In some implementations, the infinite scroll attribution script can be configured to cause the client device to append, responsive to determining that at least one of the first offset is not less than or equal to the first predetermined threshold value and determining that the second offset is not greater than or equal to the second predetermined threshold value, in the information resource page, a second inline frame. The second inline frame can be embedded with at least a second content document. In some implementations, the infinite scroll attribution script can be configured to cause the client device to set a dimension of the second inline frame of the information resource page to correspond to the dimension of the viewport of the application on which the information resource is displayed. In some implementations, the infinite scroll attribution script can be configured to cause the client device to determine, responsive to detecting the scroll event, for the second inline frame, that a third offset between a first content document end of the second content document and a first viewport end of the viewport is less than or equal to a third predetermined threshold value. In some implementations, the infinite scroll attribution script can be configured to cause the client device to determine, responsive to detecting the scroll event, for the second inline frame, that a fourth offset between a second content document end of the second content document and a second viewport end of the viewport is greater than or equal to a fourth predetermined threshold value. In some implementations, the infinite scroll attribution script can be configured to cause the client device to assign, responsive to determining that the third offset is less than or equal to the third predetermined threshold value and determining that the fourth offset is greater than or equal to the fourth predetermined threshold value, the scroll event to the second inline frame. In some implementations, the infinite scroll attribution script can be configured to cause the client device to monitor, responsive to at least one of determining that the third offset is less than or equal to the third predetermined threshold value and determining that the fourth offset is greater than or equal to the fourth predetermined threshold value, for the scroll event of the application.

In some implementations, the infinite scroll attribution script can be configured to cause the client device to determine that a dimension of the second content document is less than the dimension of the viewport. In some implementations, the infinite scroll attribution script can be configured to cause the client device to set the dimension of the second inline frame to correspond to the dimension of the content document. In some implementations, the infinite scroll attribution script can be configured to cause the client device to assign, responsive to setting the dimension of the second inline frame to correspond to the dimension of the content document, the scroll event to the information resource page.

In some implementations, the infinite scroll attribution script can be configured to cause the client device to determine that the information resource page does not have another inline frame besides the first inline frame. In some implementations, the infinite scroll attribution script can be configured to cause the client device to append, responsive to determining that the information resource page does not have the other inline frame besides the first inline frame, a second inline frame, the second inline frame embedded with at least a second content document.

In some implementations, the infinite scroll attribution script can be configured to cause the client device to monitor, for the first inline frame, subsequent to assigning the scroll event to the information resource page, for a supplemental content appendage to the first content document for the first inline frame. The supplemental content appendage can alter a dimension of the first content document. In some implementations, determining the first offset can further comprise determining the first offset, responsive to detecting the supplemental content appendage. In some implementations, determining the second offset can further comprise determining the second offset, responsive to detecting the supplement content appendage.

In some implementations, the infinite scroll attribution script can be configured to cause the client device to monitor for a change in the dimension of the viewport of the application. In some implementations, the infinite scroll attribution script can be configured to cause the client device to reset, responsive to detecting the change in the dimension of the viewport of the application, the dimension of the first inline frame of the information resource page to correspond to the dimension of the viewport of the application.

In some implementations, setting the dimension of the first inline frame of the information resource page to correspond to the dimension of the viewport of the application can further comprise setting a height of the first inline frame of the information resource page to greater than or equal to a height of the viewport of the application. In some implementations, setting the dimension of the first inline frame of the information resource page to correspond to the dimension of the viewport of the application can further comprise setting a width of the first inline frame of the information resource page to greater than or equal to a width of the viewport of the application. In some implementations, assigning the scroll event to the first inline frame can further comprise assigning a scrollable property of the first inline frame to scrollable. In some implementations, assigning the scroll event to the information resource page can further comprise assigning a scrollable property of the information resource page to scrollable.

At least one aspect is directed to a system for attributing a scroll event on an application. The system can comprise a content inclusion module, a scroll detection module, and a scroll attribution module executed on one or more processors. The content inclusion module can set a dimension of a first inline frame of an information resource page to correspond to a dimension of a viewport of an application on which the information resource is displayed. The first inline frame can be embedded with at least a first content document. The scroll detection module can monitor for a scroll event on the application. The scroll detection module can determine, responsive to detecting the scroll event, for the first inline frame, that a first offset between a first content document end of the first content document and a first viewport end of the viewport is less than or equal to a first predetermined threshold value. The scroll detection module can determine, responsive to detecting the scroll event, for the first inline frame, that a second offset between a second content document end of the first content document and a second viewport end of the viewport is greater than or equal to a second predetermined threshold value. The scroll attribution module can assign, responsive to determining that the first offset is less than or equal to the first predetermined threshold value and determining that the second offset is greater than or equal to the second predetermined threshold value, the scroll event to the first inline frame. The scroll attribution module can assign, responsive to determining that at least one of the first offset is not less than or equal to the first predetermined threshold value and determining that the second offset is not greater than or equal to the second predetermined threshold value, the scroll event to the information resource page.

In some implementations, the content inclusion module can append, responsive to determining that at least one of the first offset is not less than or equal to the first predetermined threshold value and determining that the second offset is not greater than or equal to the second predetermined threshold value, in the information resource page, a second inline frame. The second inline frame can be embedded with at least a second content document. In some implementations, the content inclusion module can set a dimension of the second inline frame of the information resource page to correspond to the dimension of the viewport of the application on which the information resource is displayed. In some implementations, the scroll detection module can determine, responsive to detecting the scroll event, for the second inline frame, that a third offset between a first content document end of the second content document and a first viewport end of the viewport is less than or equal to a third predetermined threshold value. In some implementations, the scroll detection module can determine, responsive to detecting the scroll event, for the second inline frame, that a fourth offset between a second content document end of the second content document and a second viewport end of the viewport is greater than or equal to a fourth predetermined threshold value. In some implementations, the scroll attribution module assigns, responsive to determining that the third offset is less than or equal to the third predetermined threshold value and determining that the fourth offset is greater than or equal to the fourth predetermined threshold value, the scroll event to the second inline frame. In some implementations, the scroll detection module can monitor, responsive to at least one of determining that the third offset is less than or equal to the third predetermined threshold value and determining that the fourth offset is greater than or equal to the fourth predetermined threshold value, for the scroll event of the application.

In some implementations, the content inclusion module can determine that a dimension of the second content document is less than the dimension of the viewport. In some implementations, the content inclusion module can set the dimension of the second inline frame to correspond to the dimension of the content document. In some implementations, the scroll attribution module can assign, responsive to setting the dimension of the second inline frame to correspond to the dimension of the content document, the scroll event to the information resource page.

In some implementations, the content inclusion module can determine that the information resource page does not have another inline frame besides the first inline frame. The content inclusion module can append, responsive to determining that the information resource page does not have the other inline frame besides the first inline frame, a second inline frame, the second inline frame embedded with at least a second content document.

In some implementations, the content inclusion module can monitor, for the first inline frame, subsequent to assigning the scroll event to the information resource page, for a supplemental content appendage to the first content document for the first inline frame. The supplemental content appendage can alter a dimension of the first content document. The scroll detection module can determine the first offset, responsive to detecting the supplemental content appendage. In some implementations, the scroll attribution module can determine the second offset, responsive to detecting the supplemental content appendage.

In some implementations, the content inclusion module can monitor for a change in the dimension of the viewport of the application. In some implementations, the content inclusion module can reset, responsive to detecting the change in the dimension of the viewport of the application, the dimension of the first inline frame of the information resource page to correspond to the dimension of the viewport of the application.

In some implementations, the content inclusion module can set a height of the first inline frame of the information resource page to greater than or equal to a height of the viewport of the application. In some implementations, the content inclusion module can set a width of the first inline frame of the information resource page to greater than or equal to a width of the viewport of the application. In some implementations, the scroll attribution module can set a height of the first inline frame of the information resource page to greater than or equal to a height of the viewport of the application. In some implementations, the scroll attribution module can set a width of the first inline frame of the information resource page to greater than or equal to a width of the viewport of the application.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
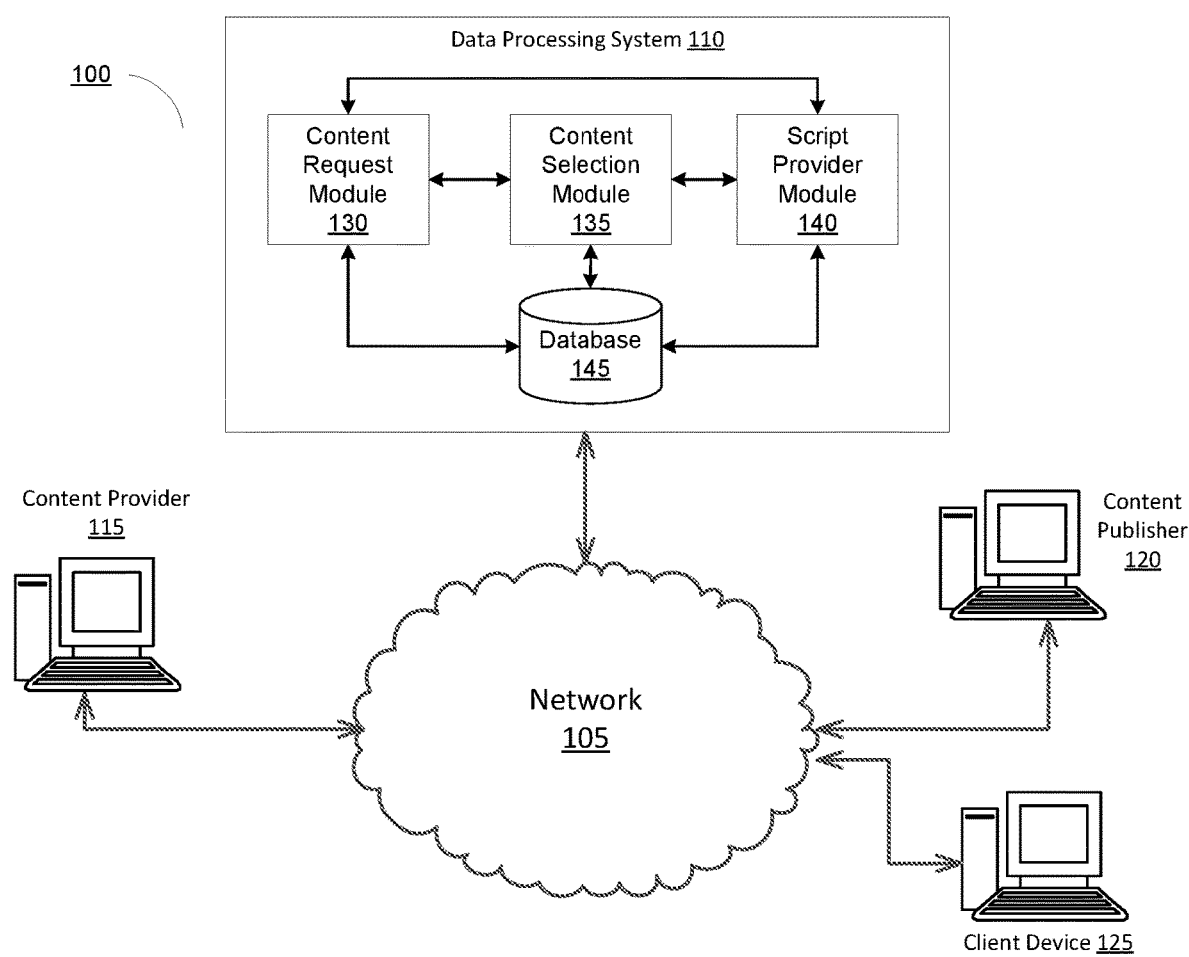
FIG. 1 is a block diagram depicting one implementation of an environment for attributing a scroll event on an application in a computer network environment, according to an illustrative implementation.

Following below are more detailed descriptions of various concepts related to, and implementations of, methods, apparatuses, and systems of attributing a scroll event on an application in a computer network environment. The various concepts introduced above and discussed in greater detail below may be implemented in any of numerous ways, as the described concepts are not limited to any particular manner of implementation.

Using infinite scrolling, additional content can be dynamically appended to the same information resource page (for example, a webpage or an application page) on an Internet-based application, such as a web browser or a native mobile application. For example, as the scroll position of the application approaches the end of the information resource page, the application can append additional content from a third-party source to the same information resource page and update the scroll length of the information resource page. In this example, content from various third-party sources can be displayed on the same information resource page using infinite scrolling. From a human-computer interaction perspective, this technique may allow the website content publisher to keep the user on the same information resource page without having the user navigating away to information resource pages of other content publishers. One implementation of infinite scrolling may be to use an inline frame. The inline frame can include content of another information resource page. When inserting inline frames that include content from third-party sources, a number of issues may arise in the way the content is presented on the information resource page, for instance, content of one page may overlap with another and some of the original code may not function properly, among others. Such issues may result in an unpleasant user experience causing users to navigate to the third-party sources to view content of the third-party pages.

To address these and other challenges, the present disclosure provides systems and methods for attributing a scroll event to either the inline frame or the information resource page containing the inline frame. The information resource page can include a scroll attribution script specifying that each inline frame for embedding the content documents is to be of one fixed dimension. For example, the height of each inline frame can be set to be the height of the viewport of the web browser or a screen of a computing device, such as a smartphone or tablet. It should be appreciated that the length of the content document with the additional content embedded within each inline frame can be variable, but the inline frames themselves can be of fixed height. By fixing at least one dimension of each inline frame that is appended to the information resource page, the original formatting and programming logic of the content documents retrieved from various third party sources can be maintained.

With the scroll attribution script, as the application detects a scroll event (e.g., onScroll or onTouch), the application can dynamically determine whether to attribute the scroll event to the one of the inline frames or the information resource page including the inline frames. The application can compare, for example, for each inline frame, the top of the content document embedded within the inline frame to the top of the viewport and the bottom of the embedded content document to the bottom of the viewport. If the offset between the top of the embedded content document and the top of the top of the viewport is less than or equal to zero and if the offset between the bottom of the embedded content document and the bottom of the viewport is greater than or equal to zero, the application can attribute the scroll event to the inline frame, allowing the content document embedded within the inline frame to scroll. Otherwise, the application can attribute the scroll event to the information resource page containing all the inline frames, thereby allowing the information resource page to scroll. Visually, as the scroll position of the content document of one inline frame nears its end, the entire information resource page may be made scrollable until the subsequent inline frame is in full view within the viewport. From a human-computer interaction perspective, the net effect of the dynamic attribution of the scroll event may be to provide the user a seamless experience between the content from various third-party sources.

At least one aspect is directed to a method of attributing a scroll event on an application. The method can include providing, to a client device, an infinite scroll attribution script. The script can be configured to execute on the client device. The script can be configured to cause the client device to set a dimension of a first inline frame of an information resource page to correspond to a dimension of a viewport of an application on which the information resource is displayed. The first inline frame can be embedded with at least a first content document. The script can be configured to cause the client device to monitor for a scroll event on the application. The script can be configured to cause the client device to determine, responsive to detecting the scroll event, for the first inline frame, that a first offset between a first content document end of the first content document and a first viewport end of the viewport is less than or equal to a first predetermined threshold value. The script can be configured to cause the client device to determine, responsive to detecting the scroll event, for the first inline frame, that a second offset between a second content document end of the first content document and a second viewport end of the viewport is greater than or equal to a second predetermined threshold value. The script can be configured to cause the client device to assign, responsive to determining that the first offset is less than or equal to the first predetermined threshold value and determining that the second offset is greater than or equal to the second predetermined threshold value, the scroll event to the first inline frame. The script can be configured to cause the client device to assign, responsive to determining that at least one of the first offset is not less than or equal to the first predetermined threshold value and determining that the second offset is not greater than or equal to the second predetermined threshold value, the scroll event to the information resource page.

FIG. 1 is a block diagram depicting one implementation of an environment for attributing a scroll event on an application. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one client device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the client device 125. The content provided by the content provider computing device 115 can include third party content items or creatives (e.g., ads) for display on information resources, such as a website or web page that includes primary content, e.g. content provided by the content publisher computing device 120. The content items can also be displayed on a search results web page. For instance, the content provider computing device 115 can provide or be the source of ads or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other client device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The end user computing devices 125 can be communication devices through which an end user can submit requests to receive content. The requests can be requests to a search engine and the requests can include search queries. In some implementations, the requests can include a request to access a web page.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120, and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content request module 130, at least one content selection module 135, at least one script provider module 140 and at least one database 145. The content item selection 130, the content selection module 135 and the script provider module 140 each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client device 125) via the network 105.

The content request module 130, the content selection module 135, and the script provider module 140 can include or execute at least one computer program or at least one script. The content request module 130, the content selection module 135, and the script provider module 140 can be separate components, a single component, or part of the data processing system 110. The content request module 130, the content selection module 135, and the script provider module 140 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, content items (e.g., advertisements), and infinite scroll attribution script, among others, to serve to a client device 125. In some implementations, the web pages, portions of webpages, and content items (e.g., advertisements) can include those illustratively depicted in FIGS. 3A-3F. Additional details of the contents of the database 145 will be provided below.

The content request module 130 can receive a request for content from the client device 125. The request for content can include a request for an information resource page including one or more inline frames (e.g., a webpage or a page for an application), a request for a content item (e.g., advertisement), or a request for a content document to embed in one of the inline frames of the information resource page, among others. The request for content can include an address or identifier for the information resource page, content document, or the content item. For example, the request for content can include Uniform Resource Locator (URL) referring to a specific resource such as a webpage (e.g., "https://www.example.com/homepage.html"). The URL for a request for a content document can include a host page different from the URL for the information resource. For example, the URL for the information resource page can be "https://www.example host.com/index.html" but the URL for the content document can be "https://www.example thirdparty.com/article1.html." In some implementations, the content request module 130 can receive a request for an information resource page that can include an indicator indicating a request for an infinite scroll attribution script. For example, the request for the information resource page can include a header including an indicator specifying the content request module 130 to send the infinite scroll attribution script along with the information resource page to the client device 125. In some implementations, the content request module 130 can subsequently and repeatedly receive another request for a content document to embed into another inline frame. In some implementations, the information resource page can include the infinite scroll attribution script inserted in the script for the information resource page. In some implementations, the information resource page can include a script for retrieving the infinite scroll attribution script for insertion into the information resource page.

The content selection module 135 can determine the content to transmit to the client device 125. The content selection module 135 can identify the address or identifier for the information resource page, content document, and the content item included in the request for content. The content selection module 135 can access the database 145 and select the information resource page, content document, or the content item identified by the address or identifier. The content selection module 135 can transmit a request to the content provider 115 or the content publisher 120 to access, retrieve, or otherwise receive the content document identified by the address or identifier. The content selection module 135 can transmit or forward the content document identified by the address or identifier to the client device 125. For example, the data processing system 110 can receive from a client device 125 a request for a content document to embed into an inline frame of the information resource page. The request may include an address referring to one of the content publishers 120. In this example, the content selection module 135 can forward the request for the content document to the respective content publisher 115. Upon receiving the content document from the respective content publisher 115, the content selection module 135 can forward the content document to the client device 125 that made the original request.

In some implementations, the content selection module 135 can identify a type of request. In some implementations, the content selection module 135 can determine whether to transmit the infinite scroll attribution script based on the request for content received from the client device 125. The content selection module 135 can determine whether the type of request corresponds to a request suitable to transmit an infinite scroll attribution script. For example, the content selection module 135 can determine whether the information resource page either already received by the client device 125 or to be sent to the client device 125 has infinite scrolling capabilities. In this example, if the information resource page already specifies infinite scrolling, the content selection module 135 can transmit the infinite scroll attribution script. In some implementations, the content selection module 135 can receive the content document or content item from an ad auction system that can select content for display based on an ad auction. The ad auction system can select an ad from a plurality of ads based on ad auction parameters, such as bid values, size of ad, click-through rate (CTR), cost per mille (CPM), and impression rate, among others.

The script provider module 140 can transmit the content to the client device 125. The content transmitted to the client device 125 can include at least an information resource page and an infinite scroll attribution script. In some implementations, the information resource page may include or be configured to include one or more inline frames, with each embedded with at least one content document. The infinite scroll attribution script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript, among others. The computer-executable instructions can be executed by an application of the client device 125, for example, the application that caused the client device to transmit the request for content received by the content request module 130. The application can include, for example, an Internet browser, mobile application, or any other computer program capable of reading and executing the computer-executable instructions. In brief overview, the computer-executable instructions, when executed by a processor of the client device 125, can cause an application of the client device to: (a) set a dimension of a first inline frame of an information resource page to correspond to a dimension of a viewport of an application on which the information resource page is displayed; (b) monitor for a scroll event on the application; (c) determine, responsive to detecting the scroll event, for the first inline frame, that a first offset between a first content document end of the first content document and a first viewport end of the viewport is less than or equal to a first predetermined threshold value; (d) determine, responsive to detecting the scroll event, for the first inline frame, that a second offset between a second content document end of the first content document and a second viewport end of the viewport is greater than or equal to a second predetermined threshold value; (e) assign, responsive to determining that the first offset is less than or equal to the first predetermined threshold value and determining that the second offset is greater than or equal to the second predetermined threshold value, the scroll event to the first inline frame; and (f) assign, responsive to determining that at least one of the first offset is not less than or equal to the first predetermined threshold value and determining that the second offset is not greater than or equal to the second predetermined threshold value, the scroll event to the information resource page. Additional details relating to the functions of the infinite scroll attribution script are provided herein with respect to FIGS. 2 and 3A-3F.

Figure 2:
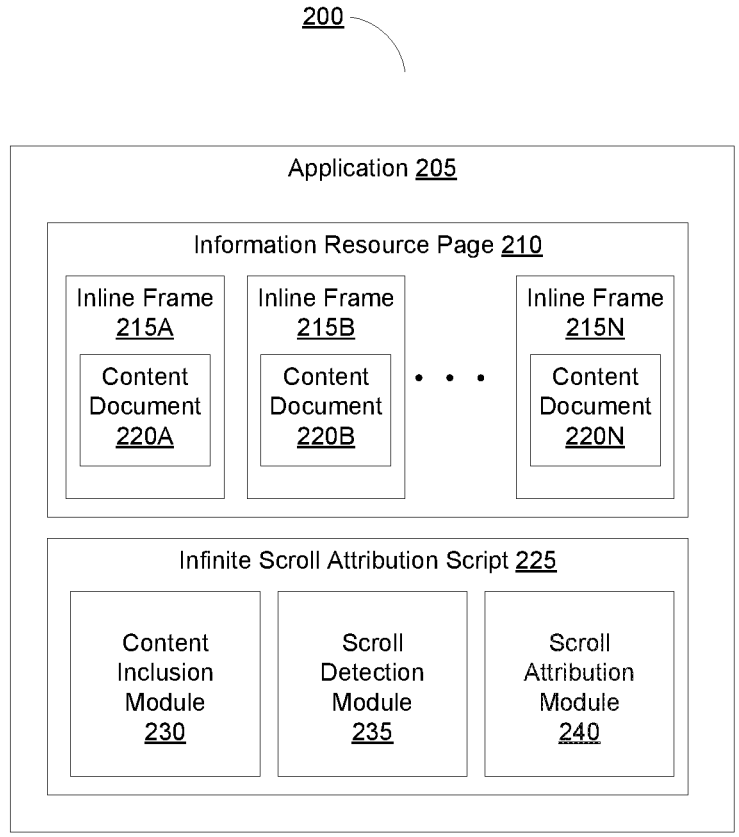
FIG. 2 is a block diagram depicting one implementation of an infinite scroll attribution system, according to an illustrative implementation.

FIG. 2 is a block diagram depicting one implementation of an infinite scroll attribution system 200, according to an illustrative implementation. The infinite scroll attribution system 200 can be run or otherwise be executed by one or more processors of a computing device, such as those described below in FIG. 5. The infinite scroll attribution system 200 can include an application 205, an information resource page 210, and an infinite scroll attribution script 225. The application 205 can include, for example, an Internet browser, mobile application, or any other computer program capable of executing or otherwise invoking computer-executable instructions, such as the computer-executable instructions included in the information resource page 210, one or more inline frames 215A-N, one or more content documents 220A-N, and infinite scroll attribution script 225. The information resource page 210 can include one or more inline frames 215A-N (e.g., iframe of HTML5). Each of the one or more inline frames 215A-N can be embedded with at least one content document 220A-N. The information resource page 210 can be received by the application 205 along with the infinite scroll attribution script 225. The infinite scroll attribution script 225 can include one or more modules, such as the content inclusion module 230, scroll detection module 235, and scroll attribution module 240.

Referring to FIGS. 3A-3F, FIGS. 3A-3F each are displays each depicting a viewport 300A-F for attributing a scroll event on an application, according to an illustrative implementation. In the example depicted in FIGS. 3A-3F, FIGS. 3A-3F each include three inline frames 215A-C and a viewport 300. Each of the three inline frames 215A-C may be embedded with a respective content document 220A-C. The dimensions of each inline frame 215A-C can be set to a dimension at least as large as the viewport 300. For example, the height of the inline frame 215A-C can be set to a height greater than the height of the viewport 300, as depicted in FIGS. 3A-3F. Conversely, the width of the inline frame 215A-C can be set to the same width as the viewport 300, as depicted in FIGS. 3A-3F. In some implementations, the dimensions of the inline frame 215A-C can be set to dimension smaller than the viewport 300. For example, if one of the dimensions of the content document 220A-C embedded in the inline frame 215A-C is smaller than the respective dimension of the viewport 300, the height and width of the respective inline frame 215A-C can be set to the height and width of the respective content document 220A-C. The viewport 300 can include the portion of the information resource page 210 visible through the application 205. The viewport 300 can include, for example, the visible area of the webpage (e.g., information resource page 210 or content document 220A-C as indicated in dotted lines) through an Internet browser (e.g., application 205). The viewport 300 can display any portion of the information resource page 210 visible through the application 205, including the content document 220A-C embedded in the respective inline frame 215A-C. The viewport 300 of the application 205 can be adjusted, shifted, or otherwise changed by scrolling on the application 205. In some implementations, the scrolling feature of the application 205 can be vertical, horizontal, or both and move along the respective axis of the information resource page 210. The dimensions of the viewport 300 can be adjusted or otherwise modified by resizing the application 205. In the examples depicted in FIGS. 3A-3F, the scroll axis of the information resource 210 and lengths of the three inline frames 215A-C may be vertical.

Figure 3A:
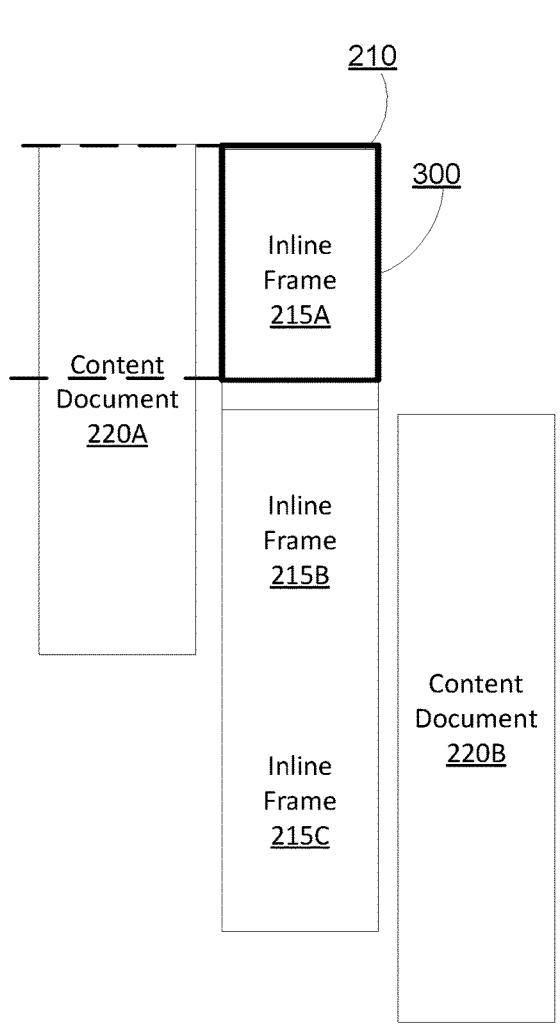
FIG. 3A is a block diagram of an information resource page and a viewport showing the portion of the content document embedded in the first inline frame in view with the scroll event attributed to the inline frame, according to an illustrative implementation.

In brief overview, the scroll event may be attributed either the one of the inline frames 215A-C or the information resource page 210 based on the position of the content document 220A-C relative to the viewport 300. For example, from a visual perspective, when one of the inline frames 215A-C occupies the entirety of the viewport 300 at least height-wise, the scroll event may be attributed to the content document 220A-C embedded in the respective inline frame 215A-C. Attributing the scroll event to the inline frame 215A-C allows scrolling on the content document 220A-C itself, as depicted in FIGS. 3A, 3B, 3D, and 3F. As the bottom end of content document 220A-C nears the bottom end of the viewport 300 when scrolling down, the attribution of the scroll event may be changed from the inline frame 215A-C to the information resource page 210, thereby scrolling the entire information resource page 210 down along with the inline frames 215A-C, as depicted in FIGS. 3C and 3 E. From a human-computer interaction perspective, toggling the attribution of the scroll event back and forth between the information resource page 210 and the inline frame 215A-C may allow for the seamless transitioning between additional content on the content documents 220A-C embedded within the respective inline frame 215A-C. The programming logic for attributing the scroll event on the application 205 is detailed below.

Referring again to FIG. 2 in conjunction with FIGS. 3A-3F, the content inclusion module 230 can include instructions to cause the client device 125 to receive content from the data processing system 110 for the information resource page 210. The content from the data processing system 110 can include at least the information resource page 210, one or more content documents 220A-N, and content items, among others. In some implementations, the content inclusion module 230 can cause the client device 125 to instantiate or otherwise append a first inline frame 215A onto the information resource page 210 to embed at least a first content document 220A into the first inline frame 215A. For example, to append the first inline frame 215A and embed the first content document 220A into the first inline frame 215A, the content inclusion module 230 can insert the HTML5 markup "<iframe src="https://example-.com"></iframe>" into the information resource page 210. In another example, using JavaScript, the content inclusion module 230 can invoke "document. createElement(<inline-_frame>)" function to instantiate and append the first inline frame 215A as a document object model (DOM) node into the DOM tree for the information resource page 210. In this example, the content inclusion module 230 can embed the first content document 220A by invoking "document.getElementbyID(<inline_frame>).src="https://example.com." In some implementations, the content inclusion module 230 can cause the client device 125 to embed pre-existing content on the information resource page 210 to the first inline frame 215A. For example, if the information resource page 210 includes primary content with text and images, separate from any inline frames 215A-N, the content inclusion module 230 can move the pre-existing primary content from the information resource page 210, embed the pre-existing content into the first inline frame 215A as a content document 220A, and remove the pre-existing primary content from the information resource page 210.

In some implementations, the content inclusion module 230 can cause the client device 125 to append a second inline frame 215B to the information resource page 210. The second inline frame 215B can be embedded with a second content document 220B. In some implementations, the content inclusion module 230 can cause the client device 125 to determine whether the information resource page 210 does not have another inline frame besides the first inline frame 215A. In some implementations, the content inclusion module 230 can cause the client device 125 to append, responsive to determining that the information resource page 210 does not have another inline frame besides the first inline frame 215A, the second inline frame 215B. In some implementations, the content inclusion module 230 can cause the client device 125 to append, responsive to receiving another content document 225B, the second inline frame 215B to the information resource page 210. For example, if the client device 125 receives another content document 220B from the data processing system 110, the content inclusion module 230 can instantiate another inline frame 215B-N in the information resource page 210 and embed the content document 220B-N into the respective inline frame 215B-N. content inclusion module 230 can cause the client device 125 to repeatedly and dynamically append one or more inline frames, such as a third inline frame 215C, to the information resource 210.

In some implementations, the content inclusion module 230 can cause the client device 125 to monitor for a supplemental content appendage to a pre-existing content document 215A-N embedded in the respective inline frame 215A-N. In some implementations, the content inclusion module 230 can cause the client device 125 to append the supplemental content appendage onto a content document 220A-N embedded into the inline frame 215A-N. For example, if the client device 125 receives an online ad to be appended to the end of the content document 220A embedded in the first inline frame 215A, the content inclusion module 230 can detect the online ad as the supplemental content appendage and append the online ad to the end of the content document 220A.

The content inclusion module 230 can include instructions to cause the client device 125 to set a dimension of the first inline frame 215A of the information resource page 210 to correspond to a dimension of a viewport 300 of an application 205 on which the information resource page 210 is displayed. The dimensions of the viewport 300 of the application may be in pixels, scaled pixels, metric, or imperial units, among others. The content inclusion module 230 can include instructions to cause the client device 125 to determine or identify the dimension of the viewport 300 of the application. For example, the content inclusion module 230 can invoke the JavaScript function "getViewportsize ()" to retrieve the size of the viewport 300. Alternatively, the content inclusion module 230 can use the HTML meta-tag "viewport" and use the "device-height" and "device-width" values to identify the dimensions of the viewport 300. In some implementations, the content inclusion module 230 can include instructions to cause the client device 125 to set the dimension of the first inline frame 215A of the information resource 210 to a dimension larger than the dimension of the viewport 300. In some implementations, the content inclusion module 230 can include instructions to cause the client device 125 to set a height of the first inline frame 215A of the information resource 210 to a height greater than or equal to the height of the viewport 300. In some implementations, the content inclusion module 230 can include instructions to cause the client device 125 to set a width of the first inline frame 215A of the information resource 210 to a width greater than or equal to the width of the viewport 300. For example, having identified the size of the viewport 300 as 1920×1080, the content inclusion module 230 can set the dimensions of the first inline frame 215A as 1920×1300. The content inclusion module 230 can include instructions to cause the client device 125 to set the dimensions of the remaining inline frames 215B-N to the same dimensions as the first inline frame 215A, as depicted in FIGS. 3A-3F. In some implementations, the content inclusion module 230 can include instructions to cause the client device 125 to set the dimensions of the remaining inline frames 215B-N to the dimensions larger than the dimension as the first inline frame 215A.

In some implementations, the content inclusion module 230 can include instructions to cause the client device 125 to determine or identify the size of content document 220A-N to be embedded into the inline frames 215A-N. In some implementations, the content inclusion module 230 can include instructions to cause the client device 125 to compare a dimension of the content document 220A-N to the dimension of the viewport 300. In some implementations, the content inclusion module 230 can set dimension of the respective inline frame 215A-N with the embedded content document 220A-N to the dimension of the content document 220A-N, responsive to comparing the dimension of the content document 220A-N with the dimension of the viewport 300. For example, if the height of the content document 220B to be embedded in the second inline frame 215B is less than the height of the viewport 300, the content inclusion module 230 can set the height of the second inline frame 215B to the height of the content document 220B.

The scroll detection module 235 can include instructions to cause the client device 125 to monitor for a scroll event on the application 205. In some implementations, the scroll detection module 235 can include instructions to cause the client device 125 to detect or otherwise listen for the scroll event. The scroll event can include, for example, an "onScroll" or "onTouch" event handler or listener. For example, if the client device 125 includes a touch display, the scroll detection module 235 can detect an "onTouch" event on the application 205 as the scroll event. In some implementations, the scroll detection module 235 can include instructions to cause the client device 125 to execute or run other instructions, responsive to detecting the scroll event. For example, the scroll detection module 235 can invoke a function upon an "onScroll" or "onTouch" event listener detecting the scroll event. In some implementations, the scroll detection module 235 can include instructions to cause the client device 125 to process the scroll event by throttling. For example, one the client device 125 receives one scroll event, the scroll detection module 235 can include instructions to cause the client device 125 not to process the scroll event until a predetermined timeframe has passed (e.g., 4 to 140 ms).

The scroll detection module 235 can include instructions to cause the client device 125 to determine, responsive to detecting the scroll event, for the first inline frame 215A, that a first offset between a first content document end of the first content document 220A and a first viewport end of the viewport 300 is less than or equal to a first predetermined threshold value. The first predetermined threshold value may be measured in pixels, scaled pixels, metric, or imperial units. The first predetermined threshold value may range from zero to an arbitrary number based on a percentage or ratio of the viewport 300. For example, the first predetermine threshold may range from 0% to 33% of the height of the viewport 300. The first predetermined threshold value may be fixed or varied. In some implementations, the scroll detection module 235 can include instructions to cause the client device 125 to identify or obtain, responsive to detecting the scroll event, the first content document end of the first content document 220A. The first content document end of the first content document 220A can be, for example, the coordinate or position on the top or left end of the first content document 220A. For example, the scroll detection module 235 can invoke the JavaScript property of "<element>.offsetTop" or "<element>.offsetLeft" to identify the top end of the first content document 220A. In some implementations, the scroll detection module 235 can include instructions to cause the client device 125 to identify or obtain, responsive to detecting the scroll event, the first viewport end of the viewport 300. The first viewport end can be, for example, the top or left end of the viewport 300. For example, the scroll detection module 235 can invoke the JavaScript properties of "window.pageYOffset" or "window.pageXOffset" to obtain the top or left size coordinates of the viewport 300. In some implementations, the scroll detection module 235 can include instructions to cause the client device 125 to compare the first content document end of the first content document 220A and the first viewport end of the viewport 300. The scroll detection module 235 can include instructions to cause the client device 125 to calculate or determine the difference or offset between the first content document end and the first viewport end and compare the difference or offset to the first predetermined threshold.

The scroll detection module 235 can include instructions to cause the client device 125 to determine, responsive to detecting the scroll event, for the first inline frame 215A, that a second offset between a second content document end of the first content document 220A and a second viewport end of the viewport 300 is greater than or equal to a second predetermined threshold value. The second predetermined threshold value may be measured in pixels, scaled pixels, metric, or imperial units. The second predetermined threshold value may range from zero to an arbitrary number based on a percentage or ratio of the viewport 300. For example, the second predetermine threshold may range from 0% to 33% of the height of the viewport 300. The second predetermined threshold value may be fixed or varied. In some implementations, the scroll detection module 235 can include instructions to cause the client device 125 to identify or obtain, responsive to detecting the scroll event, the second content document end of the second content document 220A. The second content document end of the first content document 220A can be, for example, the coordinate or position on the bottom or right end of the first content document 220A.

For example, the scroll detection module 235 can invoke the JavaScript property of "<element>.offsetTop" plus the height of the first content document 220A or "<element>.offsetLeft" to identify the top end of the first content document 220A. In some implementations, the scroll detection module 235 can include instructions to cause the client device 125 to identify or obtain, responsive to detecting the scroll event, the second viewport end of the viewport 300. The first viewport end can be, for example, the bottom or right end of the viewport 300. For example, the scroll detection module 235 can invoke the JavaScript properties of "window.pageYOffset" plus the viewport height or "window.pageXOffset" plus the viewport width to obtain the bottom or right end coordinates of the viewport 300. In some implementations, the scroll detection module 235 can include instructions to cause the client device 125 to compare the second content document end of the first content document 220A and the second viewport end of the viewport 300. The scroll detection module 235 can include instructions to cause the client device 125 to calculate or determine the difference or offset between the second content document end and the second viewport end and compare the difference or offset to the second predetermined threshold.

In some implementations, the content inclusion module 230 in conjunction with the scroll detection module 235 can include instructions to cause the client device 125 to append, responsive to determining that at least one of the first offset is not less than or equal to the first predetermined threshold value and determining that the second offset is not greater than or equal to the second predetermined threshold value, in the information resource page 210, a second inline frame 215B. The second inline frame 215B can be embedded with at least a second content document 220B. The second content document 220B can be from a third-party source, different from that of the first content document 220A or that of the information resource page 210. For example, upon determining that the first offset is not less than or equal to the first predetermined threshold value and the second offset is not greater than or equal to the second predetermined threshold value, the scroll detection module 235 can invoke the instructions of the content inclusion module 230. The content inclusion module 230 in turn can request for additional content and embed the received additional content as a second content document 220B in the second inline frame 215B. In some implementations, the content inclusion module 230 in conjunction with the scroll detection module 235 can include instructions to cause the client device 125 append, responsive to determining that the scroll position of the information resource page is within a predetermined threshold fraction or percentage of a dimension the information resource page. For example, if the scroll position is between 75% and 95% of the height of the information resource page, the content inclusion module 230 can append the second inline frame 215B onto the information resource page 210, transmit a request for additional content, and embed the received content document 220B into the second inline frame 215. The content inclusion module 230 in conjunction with the scroll detection module 235 can include instructions to cause the client device 125 to repeatedly and dynamically perform this functionality for one or more inline frames 215C-N.

The scroll attribution module 240 can include instructions to cause the client device 125 to assign, responsive to determining that the first offset is less than or equal to the first predetermined threshold value and determining that the second offset is greater than or equal to the second predetermined threshold value, the scroll event to the first inline frame 215A. In some implementations, the scroll attribution module 240 can include instructions to cause the client device 125 to initially set the scroll event to the information resource 210. In some implementations, the scroll attribution module 240 can include instructions to cause the client device 125 to assign the scroll event to the first inline frame 215A, responsive to determining that the first offset is less than or equal to the first predetermined threshold value and determining that the second offset is greater than or equal to the second predetermined threshold value. In some implementations, the scroll attribution module 240 can include instructions to cause the client device 125 to assign a scrollable property of the first inline frame 215A to scrollable. For example, upon determining that the first offset is greater zero and the second offset is greater than zero, the scroll attribution module 240 can set the scrollable property of the first inline frame 215A to true, thereby allowing the first content document 220A embedded within the first inline frame 215A to scroll.

The scroll attribution module 240 can include instructions to cause the client device 125 to assign, responsive to determining that at least one of the first offset is not less than or equal to the first predetermined threshold value and determining that the second offset is not greater than or equal to the second predetermined threshold value, the scroll event to the information resource page 210. In some implementations, the scroll attribution module 240 can include instructions to cause the client device 125 to initially set the scroll event to the first inline frame 215A. In some implementations, the scroll attribution module 240 can include instructions to cause the client device 125 to assign the scroll event to the information resource page 210, responsive to determining that the first offset is less than or equal to the first predetermined threshold value and determining that the second offset is greater than or equal to the second predetermined threshold value. In some implementations, the scroll attribution module 240 can include instructions to cause the client device 125 to assign a scrollable property of the information resource page 210 to scrollable. For example, upon determining that the first offset is greater than zero and the second offset is less than zero, the scroll attribution module 240 can set the scrollable property of the information resource page 210 to true, thereby allowing the entirety of the information resource page 210 to move along with the scroll position of the application 205.

In some implementations, the scroll attribution module 240 in conjunction with the content inclusion module 230 can include instructions to cause the client device 125 to assign the scroll event to the information resource page, responsive to determining that the dimension of the second content document 220B is less than the dimension of the viewport 300. In some implementations, the scroll attribution module 240 in conjunction with the content inclusion module 230 can include instructions to cause the client device 125 to not assign the scrollable property of the second inline frame 215B to scrollable. For example, if the height and width of the second content document 220B embedded into the second inline frame 215B is 1240×500 and the height and width of the viewport 300 is 1240×720, the scroll attribution module 240 can assign the scroll event to the information resource page 210 even if visually the scroll is on the second inline frame 215B and the entirety of second inline frame 215B is entirely in view of the viewport 300.

In some implementations, the scroll detection module 235 and the scroll attribution module 240 in conjunction with the content inclusion module 230 can include instructions to cause the client device 125 to determine that the first offset is less than or equal to the first predetermined threshold value and that the second offset is greater than or equal to the second predetermined threshold, responsive to detecting the supplemental content appendage. For example, upon determining that additional content has been appended to the first content document 220A embedded in the first inline frame 215A, the scroll detection module 235 can determine that the first offset is less than or equal to zero and that the second offset is greater than or equal to 200 pixels. In turn, the scroll attribution module 240 can assign the scroll event to either the first inline frame 215A or the information resource page 210 based on the determinations.

It should be appreciated that the scroll detection module 235 and the scroll attribution module 240 can include instructions to cause the client device 125 to determine the offsets for each inline frame 215B-N besides the first inline frame 215A using the same or different threshold values and assign the scroll event accordingly, as depicted in FIGS. 3C-F. For example, the scroll detection module 235 can include instructions to cause the client device 125 to determine, determine, responsive to detecting the scroll event, for the second inline frame, that a third offset between a first content document end of the second content document 220B and a first viewport end of the viewport 300 is less than or equal to a third predetermined threshold value. The scroll detection module 235 can also include instructions to cause the client device 125 to determine, responsive to detecting the scroll event, for the second inline frame, that a fourth offset between a second content document end of the second content document 220B and a second viewport end of the viewport 300 is greater than or equal to a fourth predetermined threshold value. The scroll attribution module 240 can include instructions to cause the client device 125 to assign, responsive to determining that the third offset is less than or equal to the third predetermined threshold value and determining that the fourth offset is greater than or equal to the fourth predetermined threshold value, the scroll event to the second inline frame 215B. These functionalities can be repeated for subsequent inline frames 215C-N.

In some implementations, the scroll detection module can include instructions to cause the client device 125 to monitor, responsive to at least one of determining that the third offset is less than or equal to the third predetermined threshold value and determining that the fourth offset is greater than or equal to the fourth predetermined threshold value, for the scroll event of the application. In some implementations, the scroll detection module 235 and the scroll attribution module 240 can determine the offsets between the content document ends of the respective content document 220A-N and the viewport ends of the viewport 300 for the last inline frame 215A-N attributed with the scroll event. For example, if the last inline frame 215A-N attributed with the scroll event was the second inline frame 215B, the scroll detection module 235 can include instructions to cause the client device 125 to determine the offsets for the second inline frame 215B.

In some implementations, the content inclusion module 230 of the infinite scroll attribution script 225 can be implemented using the following pseudo-code:

```
01    embed_doc(new_content_doc, j){
02        if(new_content_doc.size >= viewport.size)
03            instantiate(iFrame[j], new_content_doc,
    viewport.size + epsilon)
04        else
05            instantiate(iFrame[j], new_content_doc,
    new_content_doc.size) }
```

In some implementations, the scroll detection module 235 and the scroll attribution module 240 of the infinite scroll attribution script 225 can be implemented using the following pseudo-code:

```
01    onScroll( ){
02        for(iFrame[0:i:N])
03            if(iFrame[i].content_doc.top - viewport.top <=
    0 && iFrame[i].content_doc.bottom - viewport.bottom >= 0)
04                iFrame[i].scrollable(true)
05            else
06                iFrame[i].scrollable(false)
07        if(is_above_fold(iFrame[N-2:k:N].content doc))
08            embed_doc(getNewContent( ),k+1) }
09
```

```
10    is_above_fold(curFrame){
11        return(curFrame.top <= 0 || curFrame.top <=
      top_epsilon || curFrame.bottom <= bottom_epsilon) }
```

Referring again to FIG. 3A-3F in the context of the infinite scroll attribution system 200 described in conjunction with FIG. 2, the content inclusion module 230 can set the heights of the three inline frames 215A-C each to a height greater than the height of the viewport 300 and the widths of the three inline frames 215A-C each to a width of the width of the viewport 300. As depicted in FIGS. 3A-3F, each of the three inline frames 215A-C can be set to the same height and width. In FIG. 3A, the content inclusion module 230 can embed the first content document 220A into the first inline frame 215A and the second content document 220B into the second inline frame 215B. The scroll attribution module 240 can initially set the attribution of the scroll event to the first inline frame 215A. The content inclusion module 230 can instantiate a third inline frame 215C, appending the third inline frame 215C onto the information resource 210 without embedding a third content document 220C.

Figure 3B:
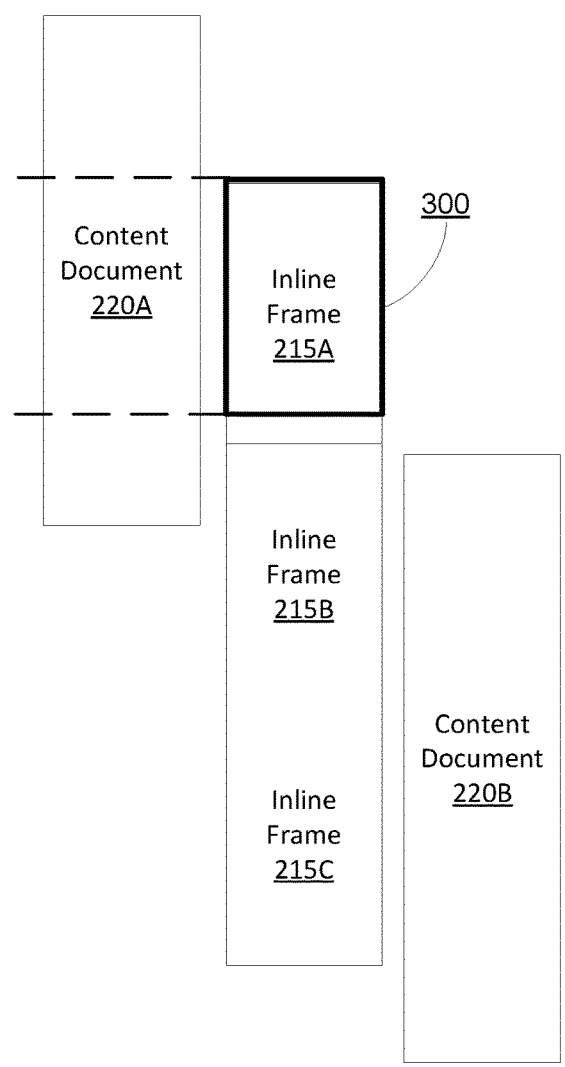
FIG. 3B is a block diagram of the information resource page depicted in FIG. 3A at another scroll position with the scroll event attributed to the first inline frame, according to an illustrative implementation.
Figure 3C:
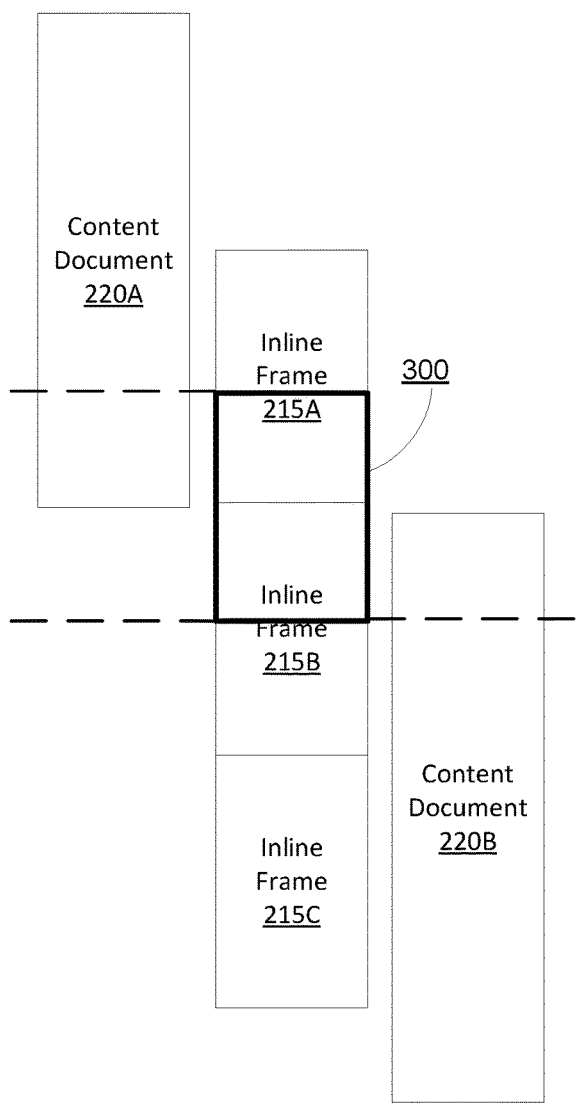
FIG. 3C is a block diagram of the information resource page depicted in FIG. 3A at another scroll position with the scroll event attributed to the information resource page, according to an illustrative implementation.

Moving onto FIG. 3B, FIG. 3B depicts the content document 220A at a scroll position below that of FIG. 3A. Like FIG. 3A, in FIG. 3B, the scroll position of the information resource 210 has not changed, since the scroll attribution module 240 may have set the attribution of the scroll event to the first inline frame 215, thereby allowing the content document 220A to be scrollable within the inline frame 215. The scroll detection module 235 can intermittently monitor for a scroll event on the application 205 using an event handler or listener. The scroll detection 230 can, at least for some of these detections, determine whether the offset between the top end of the first content document 220A and the top end of the viewport 300 is greater than zero and the bottom end of the first content document 220A and the bottom end of the viewport 300 is less than zero.

Moving onto FIG. 3C, FIG. 3C depicts the information resource 205 at a scroll position lower than those of FIGS. 3A and 3B. In FIG. 3C, as the bottom end of first content document 220A edges toward the bottom end of the first inline frame 215A, the scroll detection module 235 may have determined that the offset between the top end of the first content document 220A and the top end of the viewport 300 is greater than zero and the bottom end of the first content document 220A and the bottom end of the viewport 300 is less than zero. Based upon these comparisons, the scroll attribution module 240 may have assigned the scroll event to the information resource page 210 instead of the first inline frame 215A, thereby allowing the information resource page 210 to scroll up. Furthermore, the top end of the second inline frame 215B, embedded with the second content document 220B, may move into range or view of the viewport 300. As the scroll event has not been attributed to the second inline frame 215B, the scroll position of the embedded second content document 220B does not move.

Figure 3D:
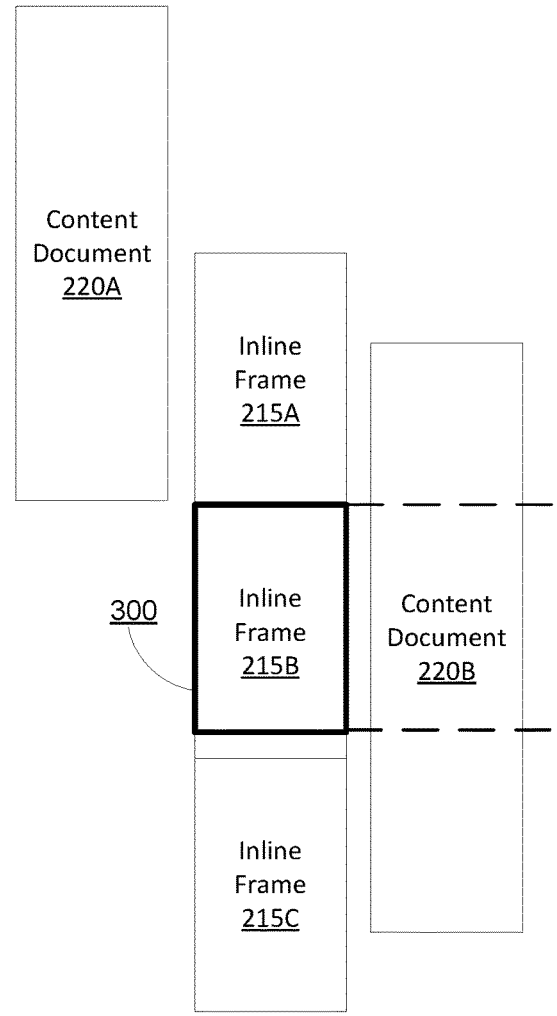
FIG. 3D is a block diagram of the information resource page depicted in FIG. 3A at another scroll position with the scroll event attributed to the second inline frame, according to an illustrative implementation.

Moving onto FIG. 3D, FIG. 3D depicts the second inline frame 215B, now attributed with the scroll event, at a lower scroll position than that of FIG. 3C. The scroll detection module 235 may have determined that the offset between the top end of the second content document 220B and the top end of the viewport 300 is less than or equal to zero and the bottom end of the second content document 220B and the bottom end of the viewport 300 is greater than or equal to zero. Based upon these comparisons, the scroll attribution module 240 can attribute the scroll event to the second inline frame 215B, thereby allowing the second content document 220B embedded in the second inline frame 215B to scroll.

Figures 3E, 3F:
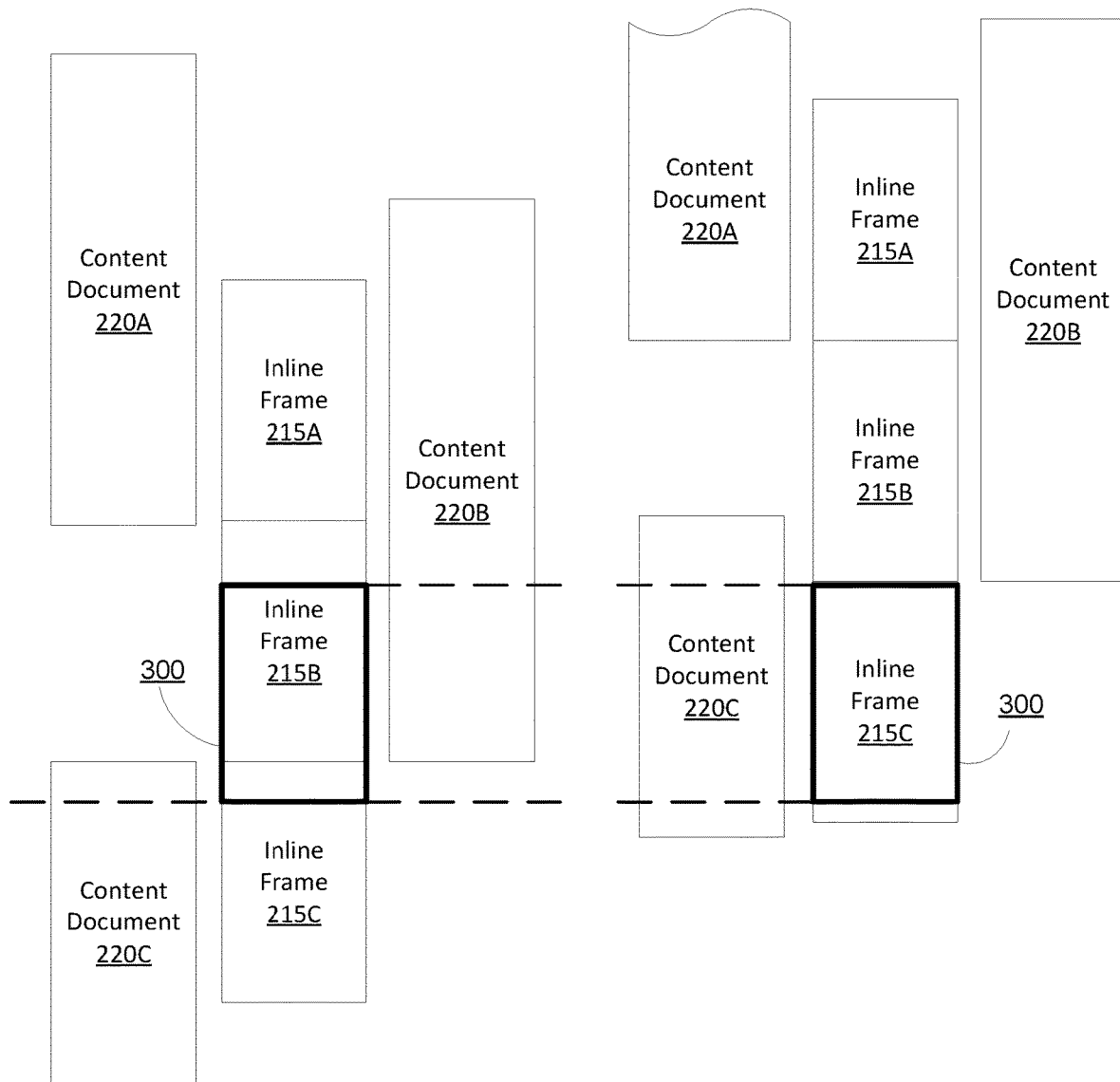
FIG. 3E is a block diagram of the information resource page depicted in FIG. 3A at another scroll position with the scroll event attributed to the information resource page, according to an illustrative implementation.
FIG. 3F is a block diagram of the information resource page depicted in FIG. 3A at another scroll position with the scroll event attributed to the third inline frame, according to an illustrative implementation.

Moving onto FIG. 3E, FIG. 3E depicts the information resource 205 at a scroll position lower than those of FIGS. 3A- 3D. In FIG. 3E, as the bottom end of second content document 220B edges toward the bottom end of the second inline frame 215B, the scroll detection module 235 may have again determined that the offset between the top end of the second content document 220B and the top end of the viewport 300 is greater than zero and the bottom end of the second content document 220B and the bottom end of the viewport 300 is less than zero. Based upon these comparisons, the scroll attribution module 240 may have assigned the scroll event to the information resource page 210 instead of the first or second inline frames 215A or 215B, thereby allowing the information resource page 210 to scroll up. In addition, the content inclusion module 230 may have requested for an additional content to embed into the third inline frame 215C and may have embedded the additional content as a third content document 220C into the third inline frame 215C. Visually, as the second inline frame 215B is not completely out of view of the viewport 300, some of the second content document 220B and the third content document 220C are visible through the viewport 300.

Moving onto FIG. 3F, FIG. 3F depicts the third content document 220C at a lower scroll position than that of FIG. 3E. In FIG. 3F, the scroll detection module 235 may have determined that the offset between the top end of the third content document 220C and the top end of the viewport 300 is less than or equal to zero and the bottom end of the third content document 220C and the bottom end of the viewport 300 is greater than or equal to zero. Based upon these comparisons, the scroll attribution module 240 can attribute the scroll event to the third inline frame 215C, thereby allowing the third content document 220C embedded in the third inline frame 215C to scroll. The content inclusion module 230 can request for additional content to append to the information resource page 210 as a content document 220D-N to embed in a respective inline frame 215D.

It should be appreciated that the functionality of the infinite scroll attribution system 200 described in conjunction with FIGS. 3A-3F can be done in the reverse in order of scroll position. For example, moving from FIG. 3F to FIG. 3E, as the scroll position of the application 205 is moved upward, the scroll detection module 230 can determine whether the offset between the top end of the third content document 220C and the top end of the viewport 300 is greater than zero and the bottom end of the third content document 220C and the bottom end of the viewport 300 is less than zero. The scroll detection module 235 can also determine whether that the offset between the top end of the second content document 220B and the top end of the viewport 300 is greater than zero and the bottom end of the second content document 220B and the bottom end of the viewport 300 is less than zero. Based on these comparisons, the scroll attribution module 240 can assign the scroll event to information resource 210, thereby allowing the entire information resource 210 to scroll. It should further be appreciated that the functionality of the infinite scroll attribution system 200 described in conjunction with FIGS. 3A-3F can be done in scroll axes in any direction or axis. For example, instead of having the scroll axis of the application 205 be vertical, the scroll axis may be horizontal. Furthermore, the inline frames 215A-C can be appended to the information resource 210 horizontally and can be embedded with content documents 220A-C that may be horizontal in length. In this example, the scroll detection module 235 can use the left and right ends of the content document 220A-C and left and right ends of the viewport 300 to calculate the offsets and assign the scroll event to either the respective inline frame 215A-C or the information resource page 210.

Figure 4:
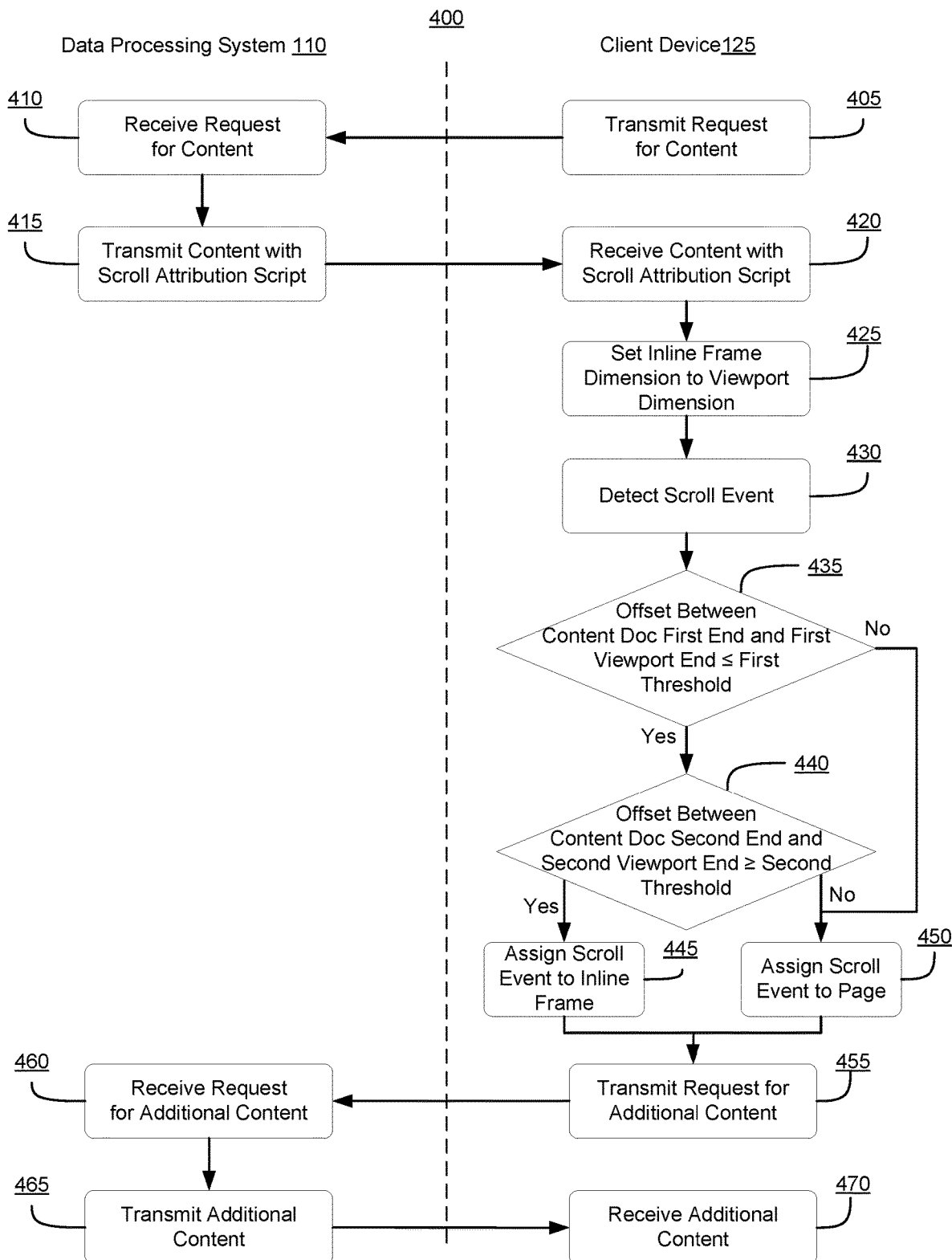
FIG. 4 is a flow diagram depicting a method of attributing a scroll event on an application, according to an illustrative implementation.

Referring to FIG. 4, FIG. 4 is a flow diagram depicting a method 400 of attributing a scroll event on an application. The functionality described herein with respect to method 400 can be performed or otherwise executed by the data processing system 110 or client device 125 as shown in FIG. 1 or the content display management system 200 as shown in FIG. 2, or any combination thereof. For example, FIG. 4 depicts the functionalities of the method 400 distributed between the data processing system 110 and the client device 125. In brief overview, the client device can transmit a request for content to the data processing system (BLOCK 405). The data processing system can receive the request for content from the client device (BLOCK 410). The data processing system can transmit the content with an infinite scroll attribution script to the client device (BLOCK 415). The client device can receive the content with the infinite scroll attribution script from the data processing system (BLOCK 420). The client device can set the dimension of the inline frame to the dimension of the viewport (BLOCK 425). The client device can detect a scroll event (BLOCK 430). The client device can determine whether a first offset between a first end of the content document and the first end of the viewport is less than or equal to a first threshold (BLOCK 435). The client device can determine whether a second offset between a second of the content document and the second end of the viewport is greater than or equal to a second threshold (BLOCK 440). If the first offset is less than or equal to the first threshold and the second offset is greater than or equal to the second threshold, the client device can assign the scroll event to the inline frame (BLOCK 445). If the first offset is not less than or equal to the first threshold and the second offset is not greater than or equal to the second threshold, the client device can assign the scroll event to information resource page (BLOCK 450). The client device can transmit a request for additional content to the data processing system (BLOCK 455). The data processing system can receive the request for additional content from the client device (BLOCK 460). The data processing system can transmit the additional content to the client device (BLOCK 465). The client device can receive the additional content from the data processing system (BLOCK 470).

In further detail, client device can transmit a request for content to the data processing system (BLOCK 405). The request for content can be at least one of a request for an information resource page including one or more inline frames (e.g., a webpage or a page for an application), a request for a content item (e.g., advertisement), or a request for a content document to embed in one of the inline frames of the information resource page, among others. The request for content can identify a type of device and an indicator indicating a request for an infinite scroll attribution script. The type of device for the client device can include, for example, a desktop computer, laptop computer, mobile phone, smartphone, and tablet, among others. The The data processing system can receive the request for content from the client device (BLOCK 410). The request for content can include a request for an information resource page including one or more inline frames (e.g., a webpage or a page for an application), a request for a content item (e.g., advertisement), or a request for a content document to embed in one of the inline frames of the information resource page, among others. The request for content can include an address or identifier for the information resource page, content document, or the content item. For example, the request for content can include Uniform Resource Locator (URL) referring to a specific resource such as a webpage (e.g., "https://www.example.com/homepage.html"). The URL for a request for a content document can include a host page different from the URL for the information resource. For example, the URL for the information resource page can be "https://www.example_host.com/index.html" but the URL for the content document can be "https://www.example_thirdparty.com/article1.html."

In some implementations, the data processing system can receive a request for an information resource page that can include an indicator indicating a request for an infinite scroll attribution script. For example, the request for the information resource page can include a header including an indicator specifying the data processing system to send the infinite scroll attribution script along with the information resource page to the client device. In some implementations, the data processing system can subsequently and repeatedly receive another request for a content document to embed into another inline frame. In some implementations, the information resource page can include the infinite scroll attribution script inserted in the script for the information resource page. In some implementations, the information resource page can include a script for retrieving the infinite scroll attribution script for insertion into the information resource page.

The data processing system can determine the content to transmit to the client device. The data processing system can identify the address or identifier for the information resource page, content document, and the content item included in the request for content. The data processing system can access the database and select the information resource page, content document, or the content item identified by the address or identifier. The data processing system can transmit a request to the content provider or the content publisher to access, retrieve, or otherwise receive the content document identified by the address or identifier. The data processing system can transmit or forward the content document identified by the address or identifier to the client device. For example, the data processing system can receive from a client device a request for a content document to embed into an inline frame of the information resource page. The request may include an address referring to one of the content publishers 120. In this example, the data processing system can forward the request for the content document to the respective content publisher. Upon receiving the content document from the respective content publisher, the data processing system can forward the content document to the client device that made the original request.

In some implementations, the data processing system can identify a type of request. In some implementations, the data processing system can determine whether to transmit the infinite scroll attribution script based on the request for content received from the client device. The data processing system can determine whether the type of request corresponds to a request suitable to transmit an infinite scroll attribution script. For example, the data processing system can determine whether the information resource page either already received by the client device or to be sent to the client device has infinite scrolling capabilities. In this example, if the information resource page already specifies infinite scrolling, the data processing system can transmit the infinite scroll attribution script. In some implementations, the data processing system can receive the content document or content item from an ad auction system that can select content for display based on an ad auction. The ad auction system can select an ad from a plurality of ads based on ad auction parameters, such as bid values, size of ad, click-through rate (CTR), cost per mille (CPM), and impression rate, among others.

The data processing system can transmit the content with an infinite scroll attribution script to the client device (BLOCK 415). The client device can receive the content with the infinite scroll attribution script from the data processing system (BLOCK 420). The content transmitted to the client device can include at least an information resource page and an infinite scroll attribution script. In some implementations, the information resource page may include or be configured to include one or more inline frames, with each embedded with at least one content document. The infinite scroll attribution script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript, among others. The computer-executable instructions can be executed by an application of the client device, for example, the application that caused the client device to transmit the request for content received by the data processing system. The application can include, for example, an Internet browser, mobile application, or any other computer program capable of reading and executing the computer-executable instructions. In brief overview, the computer-executable instructions, when executed by a processor of the client device, can cause an application of the client device to: (a) set a dimension of a first inline frame of an information resource page to correspond to a dimension of a viewport of an application on which the information resource page is displayed; (b) monitor for a scroll event on the application; (c) determine, responsive to detecting the scroll event, for the first inline frame, that a first offset between a first content document end of the first content document and a first viewport end of the viewport is less than or equal to a first predetermined threshold value; (d) determine, responsive to detecting the scroll event, for the first inline frame, that a second offset between a second content document end of the first content document and a second viewport end of the viewport is greater than or equal to a second predetermined threshold value; (e) assign, responsive to determining that the first offset is less than or equal to the first predetermined threshold value and determining that the second offset is greater than or equal to the second predetermined threshold value, the scroll event to the first inline frame; and (f) assign, responsive to determining that at least one of the first offset is not less than or equal to the first predetermined threshold value and determining that the second offset is not greater than or equal to the second predetermined threshold value, the scroll event to the information resource page.

The application can be run or otherwise be executed by one or more processors of a computing device. The application can include, for example, an Internet browser, mobile application, or any other computer program capable of executing or otherwise invoking computer-executable instructions, such as the computer-executable instructions included in the information resource page, one or more inline frames, one or more content documents, and infinite scroll attribution script. The information resource page can include one or more inline frames (e.g., iframe of HTML5). Each of the one or more inline frames can be embedded with at least one content document. The information resource page can be received by the application along with the infinite scroll attribution script.

The client device can set the dimension of the inline frame to the dimension of the viewport (BLOCK 425). In some implementations, the client device can set a dimension of the first inline frame of the information resource page to correspond to a dimension of a viewport of an application on which the information resource page is displayed. The dimensions of the viewport of the application may be in pixels, scaled pixels, metric, or imperial units, among others. The client device can determine or identify the dimension of the viewport of the application. For example, the client device can invoke the JavaScript function "getViewportsize ()" to retrieve the size of the viewport. Alternatively, the client device can use the HTML meta-tag "viewport" and use the "device-height" and "device-width" values to identify the dimensions of the viewport. In some implementations, the client device can set the dimension of the first inline frame of the information resource to a dimension larger than the dimension of the viewport. In some implementations, the client device can set a height of the first inline frame of the information resource to a height greater than or equal to the height of the viewport. In some implementations, the client device can set a width of the first inline frame of the information resource to a width greater than or equal to the width of the viewport. For example, having identified the size of the viewport as 1920×1080, the client device can set the dimensions of the first inline frame as 1920×1300. The client device can set the dimensions of the remaining inline frames to the same dimensions as the first inline frame. In some implementations, the client device can set the dimensions of the remaining inline frames to the dimensions larger than the dimension as the first inline frame.

In some implementations, the client device can determine or identify the size of content document to be embedded into the inline frames. In some implementations, the client device can compare a dimension of the content document to the dimension of the viewport. In some implementations, the client device can set dimension of the respective inline frame with the embedded content document to the dimension of the content document, responsive to comparing the dimension of the content document with the dimension of the viewport. For example, if the height of the content document to be embedded in the second inline frame is less than the height of the viewport, the client device can set the height of the second inline frame to the height of the content document.

In some implementations, the client device can to instantiate or otherwise append a first inline frame onto the information resource page to embed at least a first content document into the first inline frame. For example, to append the first inline frame and embed the first content document into the first inline frame, the client device can insert the HTML5 markup "<iframe src="https://example.com"></iframe>" into the information resource page. In another example, using JavaScript, the client device can invoke "document.createElement(<inline_frame>)" function to instantiate and append the first inline frame as a document object model (DOM) node into the DOM tree for the information resource page. In this example, the client device can embed the first content document by invoking "document.getElementbyID(<inline_frame>).src="https://example.com." In some implementations, the client device can to embed pre-existing content on the information resource page to the first inline frame. For example, if the information resource page includes primary content with text and images, separate from any inline frames, the client device can move the pre-existing primary content from the information resource page, embed the pre-existing content into the first inline frame as a content document, and remove the pre-existing primary content from the information resource page.

The client device can detect a scroll event (BLOCK 430). In some implementations, the client device can detect or otherwise listen for the scroll event. The scroll event can include, for example, an "onScroll" or "onTouch" event handler or listener. For example, if the client device includes a touch display, the client device can detect an "onTouch" event on the application as the scroll event. In some implementations, the client device can execute or run other instructions, responsive to detecting the scroll event. For example, the client device can invoke a function upon an "onScroll" or "onTouch" event listener detecting the scroll event. In some implementations, the client device can process the scroll event by throttling. For example, one the client device receives one scroll event, the client device can include instructions to cause the client device not to process the scroll event until a predetermined timeframe has passed (e.g., 4 to 140 ms).

The client device can determine whether a first offset between a first end of the content document and the first end of the viewport is less than or equal to a first threshold (BLOCK 435). In some implementations, the client device can determine, responsive to detecting the scroll event, for the first inline frame, that a first offset between a first content document end of the first content document and a first viewport end of the viewport is less than or equal to a first predetermined threshold value. The first predetermined threshold value may be measured in pixels, scaled pixels, metric, or imperial units. The first predetermined threshold value may range from zero to an arbitrary number based on a percentage or ratio of the viewport. For example, the first predetermine threshold may range from 0% to 33% of the height of the viewport. The first predetermined threshold value may be fixed or varied. In some implementations, the client device can identify or obtain, responsive to detecting the scroll event, the first content document end of the first content document. The first content document end of the first content document can be, for example, the coordinate or position on the top or left end of the first content document. For example, the client device can invoke the JavaScript property of "<element>.offsetTop" or "<element>.offsetLeft" to identify the top end of the first content document. In some implementations, the client device can identify or obtain, responsive to detecting the scroll event, the first viewport end of the viewport. The first viewport end can be, for example, the top or left end of the viewport. For example, the client device can invoke the JavaScript properties of "window.pageYOffset" or "window.pageXOffset" to obtain the top or left size coordinates of the viewport. In some implementations, the client device can compare the first content document end of the first content document and the first viewport end of the viewport. The client device can calculate or determine the difference or offset between the first content document end and the first viewport end and compare the difference or offset to the first predetermined threshold.

The client device can determine whether a second offset between a second of the content document and the second end of the viewport is greater than or equal to a second threshold (BLOCK 440). In some implementations, the client device can determine, responsive to detecting the scroll event, for the first inline frame, that a second offset between a second content document end of the first content document and a second viewport end of the viewport is greater than or equal to a second predetermined threshold value. The second predetermined threshold value may be measured in pixels, scaled pixels, metric, or imperial units. The second predetermined threshold value may range from zero to an arbitrary number based on a percentage or ratio of the viewport. For example, the second predetermine threshold may range from 0% to 33% of the height of the viewport. The second predetermined threshold value may be fixed or varied. In some implementations, the client device can identify or obtain, responsive to detecting the scroll event, the second content document end of the second content document. The second content document end of the first content document can be, for example, the coordinate or position on the bottom or right end of the first content document. For example, the client device can invoke the JavaScript property of "<element>.offsetTop" plus the height of the first content document or "<element>.offsetLeft" to identify the top end of the first content document. In some implementations, the client device can identify or obtain, responsive to detecting the scroll event, the second viewport end of the viewport. The first viewport end can be, for example, the bottom or right end of the viewport. For example, the client device can invoke the JavaScript properties of "window.pageYOffset" plus the viewport height or "window.pageXOffset" plus the viewport width to obtain the bottom or right size coordinates of the viewport. In some implementations, the client device can compare the second content document end of the first content document and the second viewport end of the viewport. The client device can calculate or determine the difference or offset between the second content document end and the second viewport end and compare the difference or offset to the second predetermined threshold.

It should be appreciated that the client device can determine the offsets for each inline frame besides the first inline frame using the same or different threshold values and assign the scroll event accordingly. For example, the client device can determine, determine, responsive to detecting the scroll event, for the second inline frame, that a third offset between a first content document end of the second content document and a first viewport end of the viewport is less than or equal to a third predetermined threshold value. The client device can also include instructions to cause the client device to determine, responsive to detecting the scroll event, for the second inline frame, that a fourth offset between a second content document end of the second content document and a second viewport end of the viewport is greater than or equal to a fourth predetermined threshold value. The client device can assign, responsive to determining that the third offset is less than or equal to the third predetermined threshold value and determining that the fourth offset is greater than or equal to the fourth predetermined threshold value, the scroll event to the second inline frame. These functionalities can be repeated for subsequent inline frame.

If the first offset is less than or equal to the first threshold and the second offset is greater than or equal to the second threshold, the client device can assign the scroll event to the inline frame (BLOCK 445). In some implementations, the client device can assign, responsive to determining that the first offset is less than or equal to the first predetermined threshold value and determining that the second offset is greater than or equal to the second predetermined threshold value, the scroll event to the first inline frame. In some implementations, the client device can initially set the scroll event to the information resource. In some implementations, the client device can assign the scroll event to the first inline frame, responsive to determining that the first offset is less than or equal to the first predetermined threshold value and determining that the second offset is greater than or equal to the second predetermined threshold value. In some implementations, the client device can assign a scrollable property of the first inline frame to scrollable. For example, upon determining that the first offset is greater zero and the second offset is greater than zero, the client device can set the scrollable property of the first inline frame to true, thereby allowing the first content document embedded within the first inline frame to scroll.

If the first offset is not less than or equal to the first threshold and the second offset is not greater than or equal to the second threshold, the client device can assign the scroll event to information resource page (BLOCK 450). In some implementations, the client device can assign, responsive to determining that at least one of the first offset is not less than or equal to the first predetermined threshold value and determining that the second offset is not greater than or equal to the second predetermined threshold value, the scroll event to the information resource page. In some implementations, the client device can initially set the scroll event to the first inline frame. In some implementations, the client device can assign the scroll event to the information resource page, responsive to determining that the first offset is less than or equal to the first predetermined threshold value and determining that the second offset is greater than or equal to the second predetermined threshold value. In some implementations, the client device can assign a scrollable property of the information resource page to scrollable. For example, upon determining that the first offset is greater than zero and the second offset is less than zero, the client device can set the scrollable property of the information resource page to true, thereby allowing the entirety of the information resource page to move along with the scroll position of the application.

In some implementations, the client device can assign the scroll event to the information resource page, responsive to determining that the dimension of the second content document is less than the dimension of the viewport. In some implementations, the client device can assign the scrollable property of the second inline frame to not scrollable. For example, if the height and width of the second content document embedded into the second inline frame is 1240× 500 and the height and width of the viewport is 1240×720, the client device can assign the scroll event to the information resource page, even if visually the scroll is on the second inline frame and the entirety of second inline frame is entirely in view of the viewport.

In some implementations, the client device can determine that the first offset is less than or equal to the first predetermined threshold value and that the second offset is greater than or equal to the second predetermined threshold, responsive to detecting the supplemental content appendage. For example, upon determining that additional content has been appended to the first content document embedded in the first inline frame, the client device can determine that the first offset is less than or equal to zero and that the second offset is greater than or equal to 200 pixels. In turn, the client device can assign the scroll event to either the first inline frame or the information resource page based on the determinations.

The client device can transmit a request for additional content (BLOCK 455). In some implementations, the client device can transmit the request for additional content, responsive to determining that the information resource page does not have another inline frame besides the first inline frame. In some implementations, the client device can transmit the request for additional content, responsive to determining that at least one of the first offset is not less than or equal to the first predetermined threshold value and determining that the second offset is not greater than or equal to the second predetermined threshold value. In some implementations, the client device can transmit the request for additional content, responsive to determining that the scroll position of the information resource page is within a predetermined threshold fraction or percentage of a dimension the information resource page. For example, if the scroll position is between 75% and 95% of the height of the information resource page, the client device can transmit the request for additional content. In some implementations, the client device can transmit the request for additional content, independent of or in parallel to BLOCKS 420-450.

The data processing system can receive the request for additional content (BLOCK 460). The request for additional content can include a request for a content document to embed in one of the inline frames of the information resource page, among others. The request for content can include an address or identifier for the content document. The data processing system can identify the address or identifier for the content document included in the request for additional content. The data processing system can access the database and select the content document identified by the address or identifier. The data processing system can transmit a request to the content provider or the content publisher to access, retrieve, or otherwise receive the content document identified by the address or identifier. The data processing system can transmit the additional content (BLOCK 465). In some implementations, the data processing system can transmit or forward the content document identified by the address or identifier to the client device.

The client device can receive the additional content (BLOCK 470). In some implementations, the client device can append another or second inline frame to the information resource page. The second inline frame can be embedded with a second content document. In some implementations, the client device can determine whether the information resource page does not have another inline frame besides the first inline frame. In some implementations, the client device can to append, responsive to determining that the information resource page does not have another inline frame besides the first inline frame, the second inline frame. In some implementations, the client device can append, responsive to receiving another content document, the second inline frame to the information resource page. For example, if the client device receives another content document from the data processing system, the client device can instantiate another inline frame in the information resource page and embed the content document into the respective inline frame. The client device can repeatedly and dynamically append one or more inline frames, such as a third inline frame, to the information resource.

In some implementations, the client device can append, responsive to determining that at least one of the first offset is not less than or equal to the first predetermined threshold value and determining that the second offset is not greater than or equal to the second predetermined threshold value, in the information resource page, a second inline frame. The second inline frame embedded with at least the second content document. For example, upon determining that the first offset is not less than or equal to the first predetermined threshold value and the second offset is not greater than or equal to the second predetermined threshold value, the client device can invoke the instructions of the client device. The client device in turn can request for additional content and embed the received additional content as a second content document in the second inline frame. The client device can repeatedly and dynamically perform this functionality for one or more inline frames.

Figure 5:
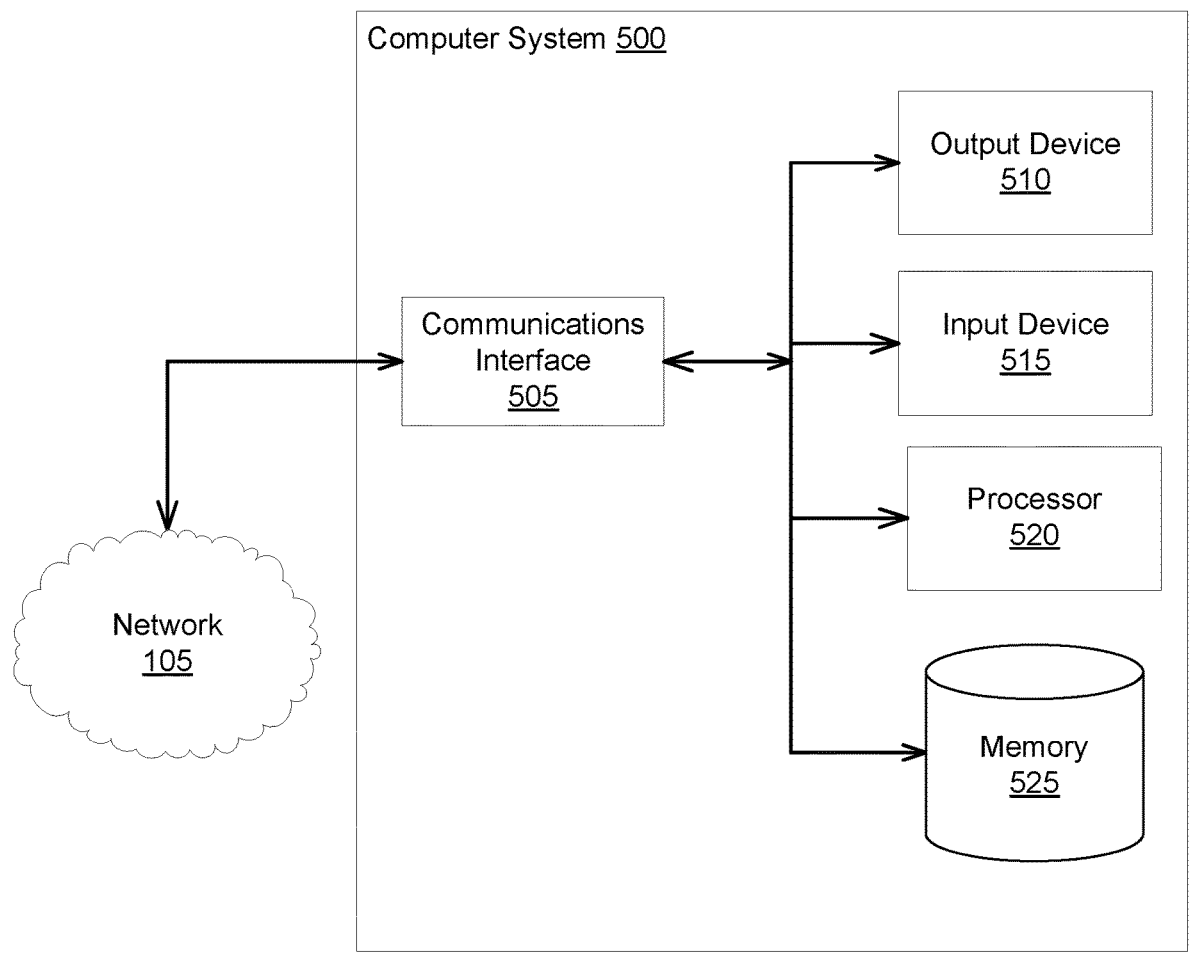
FIG. 5 is a block diagram illustrating a general architecture for a computer system that may be employed to implement elements of the systems and methods described and illustrated herein, according to an illustrative implementation.

FIG. 5 shows the general architecture of an illustrative computer system 500 that may be employed to implement any of the computer systems discussed herein (including the system 110 and its components such as the content request module 130, the content selection module 135, and script provider module 140) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 110 such as the content request module 130, the content selection module 135, the script provider module 140, the content inclusion module 230, the scroll detection module 235, and the scroll attribution module 240, among others.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 525 to store information related to the availability of inventory of one or more content units, reservations of one or more content units, among others. The memory 525 can include the database 145. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 50. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 50.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate interne connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130, the content selection module 135, and the script provider module 140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 500 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130, the content selection module 135, and the script provider module 140 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof Although the examples provided herein relate to attributing a scroll event on an application, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of attributing scroll events in applications, comprising:
   providing, by a data processing system to a client device, a script to execute on the client device, the script configured to cause the client device to:
      monitor for a scroll event on an information resource presented via a viewport of an application executing on the client device, the information resource identifying a first inline frame, the first inline frame embeddable with a content document;
      determine that an offset between an end of the content document of the first inline frame and a corresponding end of the viewport is not within a threshold value; and
      change, responsive to the scroll event and based on determining that the offset is not within the threshold value:
         a value for a scrollable property of the first inline frame from a value indicating that the content document is not allowed to scroll relative to the first inline frame to a value indicating that the content document is allowed to scroll relative to the first inline frame; and
         a value for a scrollable property of the viewport to a value indicating that the information resource is not allowed to scroll.

2. The method of claim 1, wherein the script is further configured to cause the client device to:

determine, responsive to detecting a second scroll event, a second offset between the end of the content document of the first inline frame and the corresponding end of the viewport is within the threshold value; and change, responsive to the determination that the second offset is within the threshold value:

a value for the scrollable property of the first inline frame to a value indicating that the content document is not allowed to scroll relative to the first inline frame; and a value for the scrollable property of the viewport to a value indicating that the information resource is allowed to scroll.

3. The method of claim 2, wherein the script is further configured to cause the client device to:

determine, responsive to the determination that the second offset is within the threshold, that the information resource does not have another inline frame besides the first inline frame; and add, responsive to the determination that the information resource does not have the other inline frame, to the information resource, a second inline frame adjacent to an end of the first inline frame.

4. The method of claim 2, wherein the script is further configured to cause the client device to:

transmit, responsive to the determination that the second offset is within the threshold, a request for content to insert into a second inline frame, the request including a location identifier referencing a second content document; and receive, subsequent to a transmission of the request, the second content document corresponding to the location identifier of the request to insert into the second inline frame of the information resource.

5. The method of claim 1, wherein the script is further configured to cause the client device to:

identify, responsive to receipt of a second content document to embed into a second inline frame, a dimension of the content document; and set a dimension of the second inline frame to correspond to the dimension of the second content document to embed into the second inline frame.

6. The method of claim 1, wherein the script is further configured to cause the client device to:

identify, responsive to detecting the scroll event, an axis along which a scroll position of the application is affected based on the scroll event, the axis defining a direction along which the end of the viewport is traversable via scrolling by the end of the first inline frame; and determine the offset between the end of the content document of the first inline frame and the corresponding end of the viewport about the axis along which the scroll position affected based on the scroll event is not within the threshold value.

7. The method of claim 1, wherein the script is further configured to cause the client device to:

append the first inline frame embedded with the content document to primary content of the information resource; and update a scroll length of the information resource based on the appending of the first inline frame.

8. The method of claim 1, wherein the script is further configured to cause the client device to transfer at least a portion of primary content of the information resource to the content document to embed into the first inline frame, the transferred portion of the primary content of the information resource separate from the content document of the first inline frame.

9. The method of claim 1, wherein the script is further configured to cause the client device to determine the threshold value based on at least one of a dimension of the viewport and a dimension of the information resource along an axis along which a scroll position of the application is affected based on the scroll event.

10. The method of claim 1, wherein providing the script further comprises providing, to the client device, responsive to receiving a request for content identifying the information resource, the information resource including the script to execute on the client device.

11. A system for attributing scroll events in applications, comprising:

a data processing system having one or more processors coupled with memory, configured to provide, to a client device, a script to execute on the client device, the script configured to cause the client device to:

monitor for a scroll event on an information resource presented via a viewport of an application executing on the client device, the information resource identifying a first inline frame, the first inline frame embeddable with a content document;

determine that an offset between an end of the content document of the first inline frame and a corresponding end of the viewport is not within a threshold value; and change, responsive to the scroll event and based on determining that the offset is not within the threshold value;

a value for a scrollable property of the first inline frame from a value indicating that the content document is not allowed to scroll relative to the first inline frame to a value indicating that the content document is allowed to scroll relative to the first inline frame; and a value for a scrollable property of the viewport to a value indicating that the information resource is not allowed to scroll.

12. The system of claim 11, wherein the script is further configured to cause the client device to:

transmit, responsive to a determination that a second offset is within the threshold, a request for content to insert into a second inline frame, the request including a location identifier referencing a second content document; and receive, subsequent to a transmission of the request, the second content document corresponding to the location identifier of the request to insert into the second inline frame of the information resource.

13. The system of claim 11, wherein the script is further configured to cause the client device to:

determine, responsive to a determination that a second offset is within the threshold, that the information resource does not have another inline frame besides the first inline frame; and add, responsive to the determination that the information resource does not have the other inline frame, to the information resource, a second inline frame adjacent to an end of the first inline frame.

14. The system of claim 11, wherein the script is further configured to cause the client device to:

identify, responsive to detecting the scroll event, an axis along which a scroll position of the application is affected based on the scroll event, the axis defining a direction along which the end of the viewport is traversable via scrolling by the end of the first inline frame; and determine the offset between the end of the first inline frame and the corresponding end of the viewport about the axis along which the scroll position affected based on the scroll event is not within the threshold value.

15. The system of claim 11, wherein the script is further configured to cause the client device to:

determine, responsive to detecting a second scroll event, a second offset between the end of the content document of the first inline frame and the corresponding end of the viewport is not within the threshold value; and change, responsive to the determination that the second offset is not within the threshold value:

a value for the scrollable property of the first inline frame to a value indicating that the content document is not allowed to scroll relative to the first inline frame; and a value for the scrollable property of the viewport to a value indicating that the information resource is allowed to scroll.

16. The system of claim 11, wherein the script is further configured to cause the client device to:

append the first inline frame embedded with the content document to primary content of the information resource; and update a scroll length of the information resource based on the appending of the first inline frame.

17. A method of attributing scroll events in applications, comprising:

monitoring, by a client device having one or more processors, for a scroll event on an information resource presented via a viewport of an application executing on the client device, the information resource identifying a first inline frame, the first inline frame embeddable with a content document;

determining, by the client device, that an offset between an end of the content document of the first inline frame and a corresponding end of the viewport is not within a threshold value; and changing, by the client device responsive to the scroll event and based on determining that the offset is not within the threshold value:

a value for a scrollable property of the first inline frame from a value indicating that the content document is not allowed to scroll relative to the first inline frame to a value indicating that the content document is allowed to scroll relative to the first inline frame; and a value for a scrollable property of the viewport to a value indicating that the information resource is not allowed to scroll.

18. The method of claim 17, further comprising:

transmitting, by the client device, responsive to a determination that a second offset is within the threshold, a request for content to insert into a second inline frame, the request including a location identifier referencing a second content document; and receiving, by the client device, subsequent to transmitting of the request, the second content document corresponding to the location identifier of the request to insert into the second inline frame of the information resource.

19. The method of claim 17, further comprising:

determining, by the client device, responsive to determining that a second offset is within the threshold, that the information resource does not have another inline frame besides the first inline frame; and adding, by the client device, responsive to the determination that the information resource does not have the other inline frame, to the information resource, a second inline frame adjacent to an end of the first inline frame.

20. The method of claim 17, further comprising:

appending, by the client device, the first inline frame embedded with the content document to primary content of the information resource; and updating a scroll length of the information resource based on the appending of the first inline frame.

* * * * *